US008121538B2

(12) United States Patent
Tsai et al.

(10) Patent No.: US 8,121,538 B2
(45) Date of Patent: Feb. 21, 2012

(54) COMMUNICATION SYSTEM AND HANDSHAKE METHOD THEREOF

(75) Inventors: Yi-Hsueh Tsai, Ban-Chiao (TW); Kan-Chei Loa, Taipei (TW); Yung-Ting Lee, Taipei (TW); Chun-Yen Hsu, Min-Syong Hsiang (TW)

(73) Assignee: Institute for Information Industry, Taipei (TW)

( * ) Notice: Subject to any disclaimer, the term of this patent is extended or adjusted under 35 U.S.C. 154(b) by 735 days.

(21) Appl. No.: 12/043,635

(22) Filed: Mar. 6, 2008

(65) Prior Publication Data
US 2008/0220799 A1 Sep. 11, 2008

Related U.S. Application Data

(60) Provisional application No. 60/893,132, filed on Mar. 6, 2007.

(51) Int. Cl.
*H04B 7/185* (2006.01)
*H04B 7/14* (2006.01)
*H04B 7/15* (2006.01)

(52) U.S. Cl. ........ 455/16; 455/12.1; 455/11.1; 455/13.1
(58) Field of Classification Search ................. 455/12.1, 455/16, 11.1, 13.1
See application file for complete search history.

(56) References Cited

U.S. PATENT DOCUMENTS

| 7,218,944 | B2* | 5/2007 | Cromer et al. ............. 455/515 |
| 2003/0181215 | A1* | 9/2003 | Cromer et al. ............. 455/515 |
| 2004/0109428 | A1* | 6/2004 | Krishnamurthy ............. 370/338 |
| 2006/0111080 | A1* | 5/2006 | Bajar et al. ................ 455/411 |
| 2007/0021119 | A1* | 1/2007 | Lee et al. ................... 455/436 |
| 2007/0250713 | A1* | 10/2007 | Rahman et al. ............. 713/171 |
| 2008/0065884 | A1* | 3/2008 | Emeott et al. .............. 713/168 |
| 2008/0089300 | A1* | 4/2008 | Yee .......................... 370/338 |
| 2008/0170699 | A1* | 7/2008 | Fratti et al. ................ 380/278 |
| 2008/0285499 | A1* | 11/2008 | Zhang et al. ............... 370/315 |
| 2008/0285500 | A1* | 11/2008 | Zhang et al. ............... 370/315 |
| 2009/0262718 | A1* | 10/2009 | Meier et al. ................ 370/338 |
| 2010/0020974 | A1* | 1/2010 | Tsai et al. .................. 380/270 |
| 2010/0085920 | A1* | 4/2010 | Chari et al. ................. 370/328 |

FOREIGN PATENT DOCUMENTS
WO WO 2007/019672 A1 2/2007

OTHER PUBLICATIONS

Gray et al., "Mobile WiMAX—Part 1: A Technical Overview and Performance Evaluation." *Wimax Forum v5.8*, Aug. 2006, 53 pgs.

\* cited by examiner

*Primary Examiner* — Temesgh Ghebretinsae
*Assistant Examiner* — Bobbak Safaipour
(74) *Attorney, Agent, or Firm* — Patterson Thuente Christensen Pedersen, P.A.

(57) ABSTRACT

A communication system and a handshake method thereof are provided. The communication system has a service path and comprises a BS, at least one MS, and an MS. One of the at least one RS is located within a coverage of the BS. The MS is located within a coverage of one of the at least one RS. The BS, the at least one RS, and the MS are configured to build the service path via handshaking according to a plurality of control signals, each of the control signals has an authentication code adopted to be authenticated completeness of the control signal, and each of the control signals is generated by one of the BS, the at least one RS, and the MS.

17 Claims, 14 Drawing Sheets

COMMUNICATION SYSTEM AND HANDSHAKE METHOD THEREOF

This application claims the benefit of priority based on U.S. Ser. No. 60/893,132 filed on Mar. 6, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a communication system and a handshake method thereof. More specifically, the present invention relates to a communication system and a handshake method thereof for use in a wireless network.

2. Descriptions of the Related Art

The IEEE 802.16 is a major technology for broadband wireless access. Relay technology is used to extend the coverage and solve the dead spot problem. Currently, the relay technology in the IEEE 802.16 is defined in the IEEE 802.16j standard. Although the IEEE 802.16j standard already provides the solution for the dead spot, there still exist some defects of service path (e.g. FTP, e-mail, and so on) addition. A hashed message authentication code/cipher-based message authentication code (HMAC/CMAC) tuple is used to protect a control message not to be stolen and/or altered in IEEE 802.16j standard. For example, if a base station (BS) intends to transmit a control signal with an HMAC/CMAC tuple to a mobile station (MS), the HMAC/CMAC must comprise an MS authentication code for the MS to authenticate whether the control message is stolen and/or altered according to the HMAC/CMAC tuple.

Since the HMAC/CMAC tuple only comprises the MS authentication code, a relay station (RS) along the same relay path with the MS can only read the information of the control message but not to authenticate completeness of the control message. If the RS wants to authenticate the information of the control signal, the BS must transmit control signal with HMAC/CMAC comprising an RS authentication code to the RS. That means that the BS must transmit the control message with the same information twice (i.e. to the RS and to the MS), which increases the extra load in the relay path. Transmitting a control signal in the opposite direction, i.e. from the MS to the BS, also faces the same problem.

Consequently, how to make the BS/MS transmit the control signal with the HMAC/CMAC tuple only once and make all RSs and BSs along the same relay path can receive the control signal and authenticate completeness of the control message is still an objective for the industry to endeavor.

SUMMARY OF THE INVENTION

One objective of the present invention is to provide a communication system for use in a wireless network. The communication system has a service path and comprises a base station (BS), at least one relay station (RS), and a mobile station (MS). One of the at least one RS is located within a coverage of the BS. The MS is located within a coverage of one of the at least one RS. The BS, the at least one RS, and the MS are configured to build the service path via handshaking according to a plurality of control signals. Each of the control signals has an authentication code adopted to be authenticated completeness of the corresponding control signal. At least one of the authentication codes comprises an RS authentication code and an MS authentication code.

Another objective of the present invention is to provide a handshake method for building a service path for a communication system for use in a wireless network. The handshake method comprises the following steps of: transmitting a BS request signal comprising an RS authentication code and an MS authentication code, wherein the RS authentication code and the MS authentication code are adopted to authenticate completeness of the BS request signal; transmitting an MS response signal comprising the MS authentication code when the BS request signal is complete, wherein the MS authentication code is adopted to authenticate completeness of the MS response signal; and transmitting a BS acknowledgement signal comprising the RS authentication code and the MS authentication code when the MS response signal is complete, wherein the RS authentication code and the MS authentication code are adopted to authenticate completeness of the BS acknowledgement signal.

A further objective of the present invention is to provide a handshake method for building a service path for a communication system for use in a wireless network. The handshake method comprises the following steps of: transmitting an MS request signal comprising an MS authentication code, the MS authentication code being adopted to authenticate completeness of the MS request signal; transmitting a BS response signal comprising an RS authentication code and the MS authentication code when the MS request signal is complete, the RS authentication code and the MS authentication code being adopted to authenticate completeness of the BS response signal; and transmitting an MS acknowledgement signal comprising the MS authentication code when the BS response signal is complete, the MS authentication code being adopted to authenticate completeness of the MS acknowledgement signal.

The present invention builds a service path of a communication system via handshaking according to a plurality of control signals, wherein the communication system comprises a BS, at least one RS, and an MS. Each of the control signals has an authentication code adopted to be authenticated completeness of the control signal, wherein at least one of the authentication codes comprises an RS authentication code and an MS authentication code. More particularly, the control signal that has the authentication code comprising the RS authentication code and the MS authentication code is generated by the BS.

Since the control signal generated by the BS comprises both the RS authentication code and the MS authentication code, the RSs along the transmission path (relay path) can authenticate completeness of the control signal according to the RS authentication code of the authentication code of the very same control signal. That means the BS does not need to transmit the same control message with different authentication codes to the RSs and the MS separately. Hence, the present invention can solve the defects of the convention technique effectively and decrease the extra load in the transmission path.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The wireless networks in the following embodiments are based on the IEEE 802.16 standard; however, wireless networks in other embodiments may be based on the other wireless network standards. In other words, the wireless network standard adopted in the following embodiments is not to limit the present invention.

Figure 1:
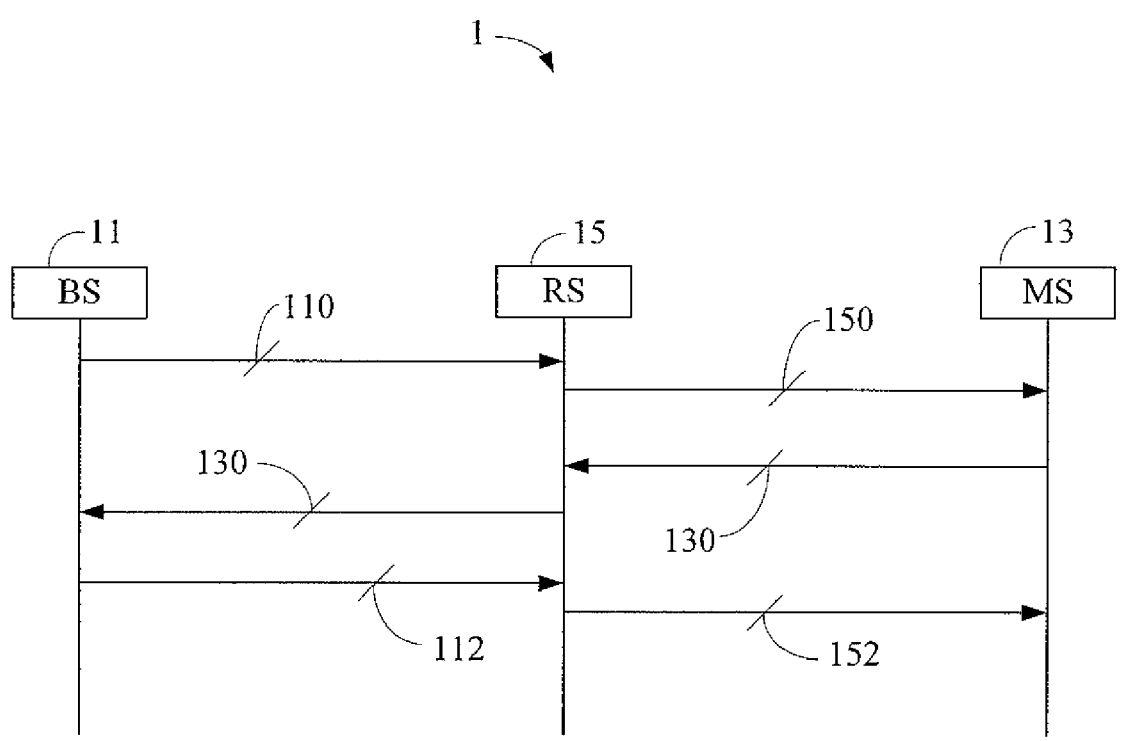
FIG. 1 is a schematic view of the first embodiment of the present invention.

A first preferred embodiment of the present invention is shown in FIG. 1, which is a communication system 1 for use in a wireless network. The communication system 1 comprises a BS 11, an RS 15, and an MS 13. To describe this embodiment clearly, it is assumed that the RS 15 is located within a coverage of the BS 11, and the MS 13 is located within a coverage of the RS 15. The BS 11, the RS 15, and the MS 13 are configured to build a service path (e.g. FTP, e-mail, and so on) via handshaking according to a plurality of control signals. Each of the control signals has an authentication code adopted to be authenticated completeness of the control signal, and at least one of the authentication codes comprises an RS authentication code and an MS authentication code.

The BS 11, the RS 15, and the MS 13 have a downlink relay sequence from the BS 11 to the MS 13 and an uplink relay sequence from the MS 13 to the BS 11. Both the downlink relay sequence and the uplink sequence will be referenced later.

When the BS 11 attempts to build the service path with the MS 13 actively, it generates a first BS request signal 110 comprising the service path information for building the service path. The first BS request signal 110 is one of the aforementioned control signals, and the authentication code of the first BS request signal 110 comprises the RS authentication code and the MS authentication code, wherein the RS authentication code and the MS authentication code are respectively used by the RS 15 and the MS 13 for authenticating completeness of signals related to the first BS request signal 110. The BS 11 then transmits the first BS request signal 110 to the RS 15 (i.e. the next RS to the BS 11) following the downlink relay sequence, which can be known by the RS according to RS connection identifier (CID) (such as RS basic, primary or multicast management CID, etc.) in the header of the first BS request signal 110 firstly because the MS 13 is not directly connected to the BS 11.

More specifically, since the communication system 1 conforms to the IEEE 802.16 standard, the control signals follow the dynamic service addition (DSA) of the IEEE 802.16 standard, the RS authentication code is a hashed message authentication code/cipher-based message authentication code (HMAC/CMAC) tuple with a group key (such as Security Zone Key in the IEEE 802.16 standard) for the RS based on the IEEE 802.16 standard, and the MS authentication code is an HMAC/CMAC tuple for the MS based on the IEEE 802.16 standard. The group key is a key shared by the BS and a number of RSs within the same group. The RS and MS authentication codes are only parsed by the RS 15 and the MS 13 respectively, and the use of the HMAC/CMAC and the SZK is well-known by those skilled in the art and are not described again.

The RS 15 is configured to receive the first BS request signal 110 and to authenticate completeness of the first BS request signal 110 according to the RS authentication code. The last RS in the downlink relay sequence, i.e. the RS 15, is further configured to remove the RS authentication code from the first BS request signal 110, generate a second BS request signal 150 comprising the MS authentication code and the service path information, and transmit the second BS request signal 150 to the MS 13 containing the MS CID (such as MS basic, primary or secondary management CID, etc.) in the header of the second BS request signal 150, wherein the second BS request signal 150 is also one of the aforementioned control signals. Removing the RS authentication code from the first BS request signal 110 has the following benefits: decreasing the extra load in the transmission path (relay path) and removing the information which is not needed by the MS 13.

The MS 13 is further configured to receive the second BS request signal 150 from the RS 15, and authenticate completeness of the second BS request signal 150 according to the MS authentication code. Up to now, the MS 13 has known that the BS 11 attempts to build the service path actively. The MS 13 then generates and transmits an MS response signal 130 to the RS 15 containing the MS CID in the header of the MS response signal 130 firstly when the second BS request signal 150 is complete. It should be noted that the MS response signal 130 is also one of the control signals and the authentication code of the MS response signal 130 comprises the MS authentication code.

The RS 15 is further configured to relay the MS response signal 130 to the BS 11 following the uplink relay sequence and containing the MS CID. The RS 15 does not authenticate completeness of the MS response signal 130 because the RS 15 can not parse the MS authentication code. The BS 11 is further configured to receive the MS response signal 130 and to authenticate completeness of the MS response signal 130 according to the MS authentication code therein. Thus, the BS 11 knows that the MS 13 has received the second BS request signal 150. Then, the BS 11 generates a first BS acknowledgement signal 112 and transmits it to the RS 15 following the downlink relay sequence and containing the RS CID in the header of the first BS acknowledgement signal 112 when the MS response signal 130 is complete. The BS acknowledgement signal 112 is also one of the control signals, and the authentication code of the first BS acknowledgement signal 112 comprises the RS authentication code and the MS authentication code.

The RS 15 is further configured to receive the first BS acknowledgement signal 112 and to authenticate completeness of the first BS acknowledgement signal 112 according to the RS authentication code. The last RS in the downlink relay sequence, i.e. RS 15, is further configured to remove the RS authentication code from the first BS acknowledgement signal 112, generate a second BS acknowledgement signal 152 comprising the MS authentication code, and transmit the second BS acknowledgement signal 152 to the MS 13 containing the MS CID in the header of the second BS acknowledgement signal 152, wherein the second BS acknowledge signal 152 is also one of the control signals. The MS 13 is further configured to receive the second BS acknowledgement signal 152 from the RS 15 and authenticate completeness of the second BS acknowledgement signal 152 according to the MS authentication code. The service path between the BS 11, the MS 13, and the RS 15 is build when the second BS acknowledgement signal 152 is complete.

Additionally, the RS 15 has a timer (not shown) which is started after the RS 15 receives the first BS request signal 110 and stopped after the RS 15 receives the first BS acknowledgement signal 112. If the RS 15 does not receive the first BS acknowledgement signal 112 to stop the timer in a predetermined time period, the timer enables the RS 15 to generate and transmit a retransmitting request signal (not shown) to the BS 11. After receiving the retransmitting request signal, the BS 11 will retransmit the first BS request signal 110. It should be noted that the timer within the RS 15 is optional and does not limit the present invention.

Figure 2:
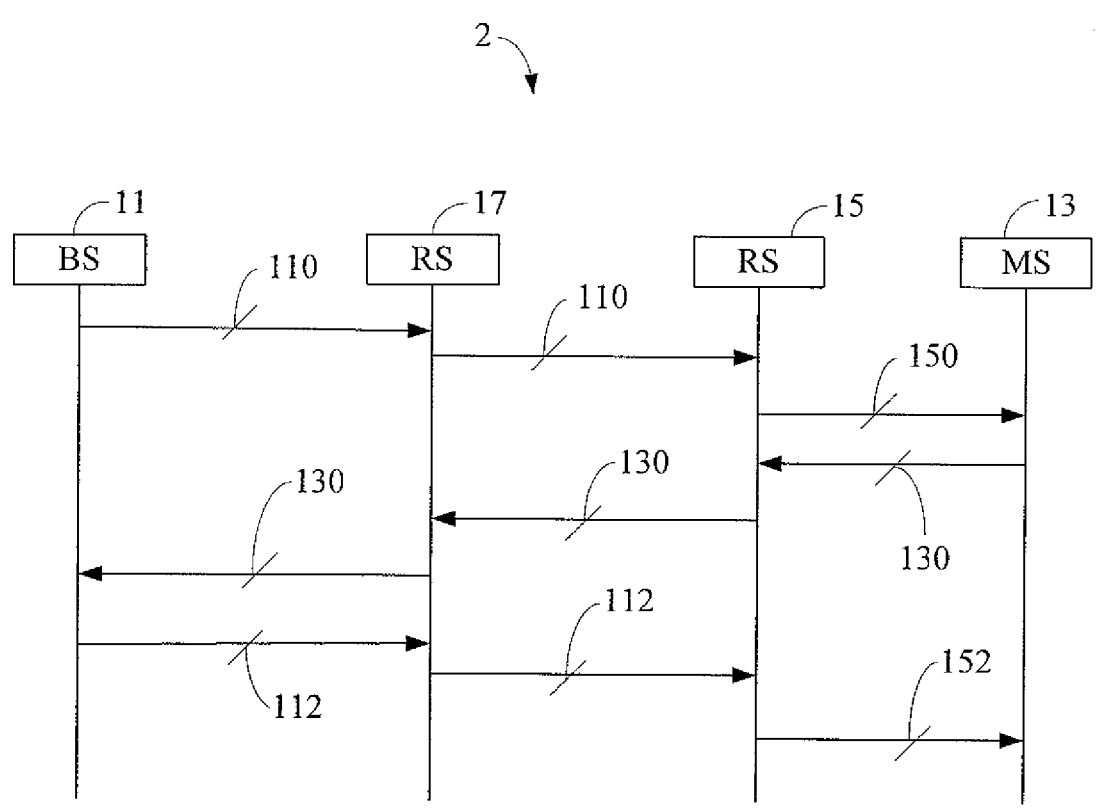
FIG. 2 is a schematic view of the second embodiment of the present invention.

A second preferred embodiment of the present invention is shown in FIG. 2, which is a communication system 2 for use in a wireless network. The communication system 2 comprises a BS 11, a plurality of RSs (i.e. RS 15 and RS 17), and a MS 13, but the number of the RS does not limit the present invention. To describe this embodiment clearly, it is assumed that only one of the RSs (i.e. the RS 17) is located within the coverage of the BS 11, the RS 15 is located within the coverage of the RS 17, and the MS 13 is located within the coverage of the RS 15. The BS 11, the RS 17, the RS 15, and the MS 13 are configured to build a service path (e.g. FTP, e-mail, and so on) via handshaking according to a plurality of control signals, each of the control signals has an authentication code adopted to be authenticated completeness of the control signal, and at least one of the authentication codes comprise an RS authentication code and an MS authentication code. The BS 11, the RS 15, the RS 17, and the MS 13 have a downlink relay sequence from the BS 11 to the MS 13; in this embodiment, the downlink relay sequence from the BS 11 to the MS 13 is the BS 11, the RS 17, the RS 15 to the MS 13. The BS 11, the RS 15, the RS 17, and the MS 13 have an uplink relay sequence from the MS 13 to the BS 11; in this embodiment the uplink relay sequence from the MS 13 to the BS 11 is the MS 13, the RS 15, the RS 17 to the BS 11.

More particularly, when the BS 11 attempts to build the service path with the MS 13 actively, it generates a first BS request signal 110 comprising the service path information for building the service path. The BS 110 transmits the first BS request signal 110 to the next RS, i.e. the RS 17, following the downlink relay sequence and containing the RS CID in the header of the first BS request signal 110 firstly because the MS 13 is not in the coverage of the BS 11. The first BS request signal 110 is one of the aforementioned control signals, and the authentication code of the first BS request signal 110 comprises an RS authentication code and an MS authentication code. The RS authentication code is used by the RS 15 and RS 17 for authenticating completeness of the first BS request signal, while the MS authentication code is used by the MS 13 for authenticating completeness of signals related to the first BS request signal. It should be noted that the RS authentication code is only parsed by the RS 15 and the RS 17, and the MS authentication code is only parsed by MS 13. In other words, the RS authentication code is universal to the RS 15 and the RS 17.

The RS 17 is configured to receive the first BS request signal 110 and authenticate completeness of the first BS request signal 110 according to the RS authentication code. The RS 17 is further configured to relay the first BS request signal 110 to the RS 15 following the downlink relay sequence and containing the RS CID in the header of the first BS request signal 110 when the first BS request signal 110 is complete. The RS 15 is configured to receive the first BS request signal 110 and authenticate completeness of the first BS request signal 110 according to the RS authentication code. The RS 15 is further configured to remove the RS authentication code from the first BS request signal 110 because it is the last RS in the downlink relay sequence.

The RS 15 is further configured to generate a second BS request signal 150 comprising the MS authentication code and the service path information and transmit the second BS request signal 150 to the MS 13 containing the MS CID in the header of the second BS request signal 150. It is noted that the second BS request signal 150 is also one of the control signals. Removing the RS authentication code not parsed by the MS 13 from the first BS request signal 110 has the following benefits: decreasing the extra load in the transmission path (relay path) and removing the information which is not needed by the MS 13.

The MS 13 is further configured to receive the second BS request signal 150 from the RS 15 and authenticate completeness of the second BS request signal 150 according to the MS authentication code. Up to now, the MS 13 has known that the BS 11 attempts to build the service path actively. The MS 13 then generates and transmits an MS response signal 130 to the RS 15 containing the MS CID in the header of the MS response signal 130 firstly when the second BS request signal 150 is complete. It should be noted that the MS response signal 130 is also one of the control signals and the authentication code of the MS response signal 130 comprises the MS authentication code.

The RS 15 and the RS 17 are further configured to relay the MS response signal 130 to the BS 11 following the uplink relay sequence and containing the MS CID in the header of the MS response signal 130. The RS 15 and the RS 17 do not authenticate completeness of the MS response signal 130 because the RS 15 and the RS 17 can not parse the MS authentication code. The BS 11 is further configured to receive the MS response signal 130 and to authenticate completeness of the MS response signal 130 according to the MS authentication code. Now, the BS 11 knows that the MS 13 has received the second BS request signal 150, so the BS 11 further generates a first BS acknowledgement signal 112 and transmits the first BS request signal 112 to the RS 17 following the downlink relay sequence and containing the RS CID in the header of the first BS request signal 112 when the MS response signal 130 is complete. The BS acknowledgement signal 112 is also one of the control signals, and the authentication code of the first BS acknowledgement signal 112 comprises the RS authentication code and the MS authentication code.

The RS 17 is further configured to receive the first BS acknowledgement signal 112 and authenticate completeness of the first BS acknowledgement signal 112 according to the RS authentication code. The RS 17 is further configured to relay the first BS acknowledgement signal 112 to the RS 15 following the downlink relay sequence and containing the RS CID in the header of the first BS request signal 112 when the first BS acknowledgement signal 112 is complete.

The RS 15 is further configured to receive the first BS acknowledgement signal 112 from the RS 17 and authenticate completeness of the first BS acknowledgement signal 112 according to the RS authentication code. Since the RS 15 is the last RS in the downlink relay sequence, it removes the RS authentication code from the first BS acknowledgement signal 112. Furthermore, the RS 15 generates a second BS acknowledgement signal 152 comprising the MS authentication code and transmits the second BS acknowledgement signal 152 to the MS 13 containing the MS CID in the header of the second BS acknowledgement signal 152, wherein the second BS acknowledge signal 152 is one of the control signals.

The MS 13 is further configured to receive the second BS acknowledgement signal 152 from the RS 15 and authenticate completeness of the second BS acknowledgement signal 152 according to the MS authentication code. The service path between the BS 117 the MS 13, and the RS 15, the RS 17 is built when the second BS acknowledgement signal 152 is complete.

In addition to the aforementioned functions, each of the RS 15 and the RS 17 has a timer (not shown). After the RS 15 and the RS 17 receive the first BS request signal 110, the corresponding timers are started respectively. Furthermore, after the RS 15 and the RS 17 receive the first BS acknowledgement signal 112, the corresponding timers are stopped respectively. If the RS 15 and/or the RS 17 does not receive the first BS acknowledgement signal 112 to stop the timer in a predetermined time period, the timer enables the RS 15 and/or the RS 17 to generate and transmit a retransmitting request signal (not shown) to the BS 11. After receiving the retransmitting request signal, the BS 11 will transmit the first BS request signal 110 again. It should be noted that the timers within the RS 15 and the RS 17 are optional and does not limit the present invention.

Figure 3:
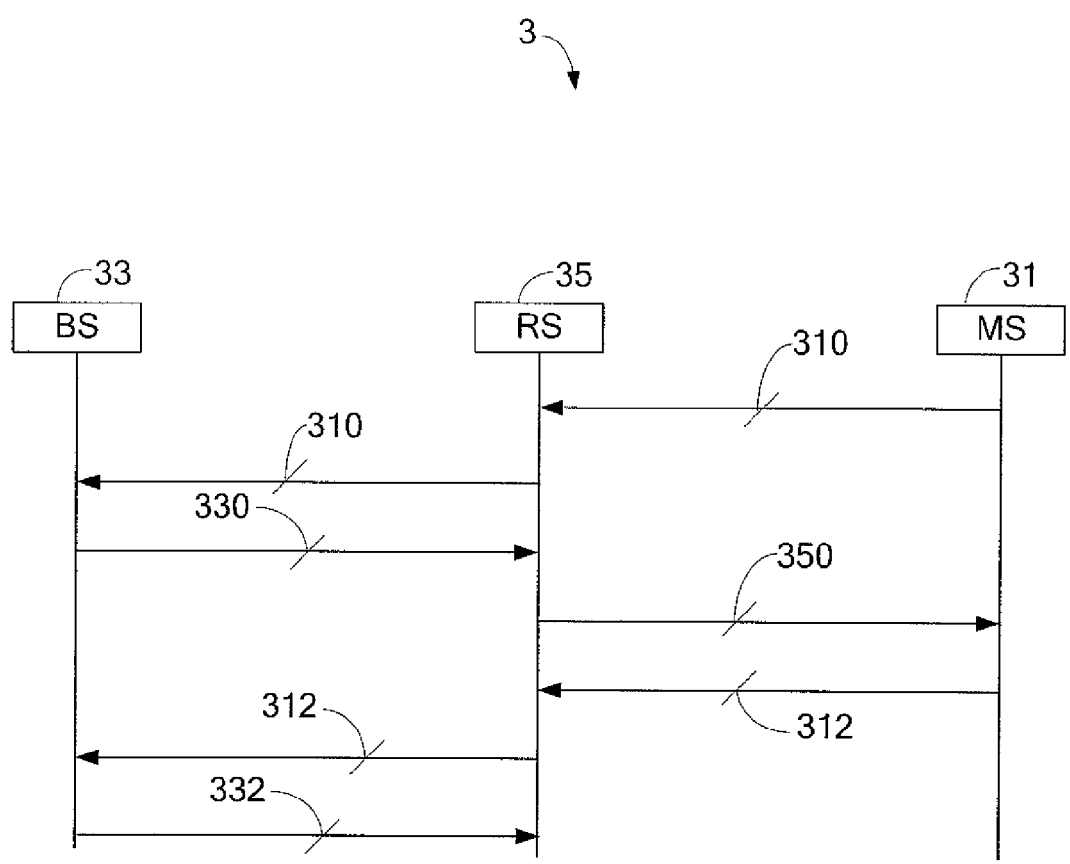
FIG. 3 is a schematic view of the third embodiment of the present invention.

A third preferred embodiment of the present invention is shown in FIG. 3, which is a communication system 3 for use in a wireless network. The communication system 3 comprises an MS 31, a BS 33, and an RS 35. To describe this embodiment clearly, it is assumed that the RS 35 is located within a coverage of the BS 33, and the MS 31 is located within a coverage of the RS 35. The BS 33, the RS 35, and the MS 31 are configured to build a service path (e.g. FTP, e-mail, and so on) via handshaking according to a plurality of control signals. Each of the control signals has an authentication code adopted to be authenticated completeness of the control signal, and one of the authentication codes comprises an RS authentication code and an MS authentication code.

The BS 33, the RS 35, and the MS 31 have a downlink relay sequence from the BS 33 to the MS 31 and an uplink relay sequence from the MS 31 to the BS 33. Both the downlink relay sequence and the uplink sequence will be referenced later.

When the MS 31 attempts to build the service path with the BS 33 actively, it generates an MS request signal 310 comprising the service path information for building the service path. The MS request signal 310 is one of the control signals, and the authentication code of the MS request signal 310 comprises the MS authentication code so that the BS 33 can authenticate completeness of the MS request signal 310. Then, the MS 310 transmits the MS request signal 310 to the RS 35 following the uplink relay sequence and containing the MS CID in the header of the MS request signal 310.

The RS 35 is configured to receive the MS request signal 310 from the MS 31 and relay it to the BS 33 following the uplink relay sequence and containing the MS CID in the header of the MS request signal 310 directly, which means that the RS 35 does not authenticate completeness of the MS request signal 310. The BS 33 is further configured to receive the MS request signal 310 and authenticate completeness of the MS request signal 310 according to the MS authentication code. Up to now, the BS 33 has known that the MS 31 attempts to build the service path actively. After authenticating the MS request signal 310 is complete, the BS 33 generates a first BS response signal 330 and transmits the first response signal 330 to the RS 35 following the downlink relay sequence and containing the RS CID in the header of the first BS response signal 330. The first BS response signal 330 is one of the control signals, and the authentication code of the first BS response signal 330 comprises the RS authentication code and the MS authentication code.

After receiving the first BS response signal 330, the RS 35 is configured to authenticate completeness of the first BS response signal according to the RS authentication code, remove the RS authentication code from the first BS response signal 330, generate a second BS response signal 350 comprising the MS authentication code, and transmit the second BS response signal 350 to the MS 31 following the downlink relay sequence and containing the MS CID in the header of the second BS response signal 350. The second BS response signal 350 is one of the control signals.

The MS 31 is further configured to receive the second BS response signal 350 from the RS 35 and authenticate completeness of the second BS response signal 350 according to the MS authentication code. By receiving the complete second BS response signal 350, the MS 31 knows that the BS 33 has received the MS request signal 310. The MS 31 further generates an MS acknowledgement signal 312 and transmits the MS acknowledgement signal 312 to the RS 35 following the uplink relay sequence and containing the MS CID in the header of the MS acknowledgement signal 312. The MS acknowledgement signal 312 is also one of the control signals and the authentication code of the MS acknowledgement signal 312 comprises the MS authentication code.

The RS 35 is configured to receive the MS acknowledgement signal 312 and relay it to the BS 33 following the uplink relay sequence and containing the MS CID in the header of the MS acknowledgement signal 312 directly. It means that the RS 35 does not authenticate completeness of the MS acknowledgement signal 312. The BS 33 is further configured to receive the acknowledgement signal 312 and authenticate completeness of the MS acknowledgement signal 312 according to the MS authentication code.

In this embodiment, the BS 33 is further configured to generate and transmit a BS confirmation signal 332 comprising the RS authentication code to the RS 35 following the downlink relay sequence when the MS acknowledgement signal 312 is complete. The RS 35 is further configured to receive the BS confirmation signal 332 and to authenticate completeness of the BS confirmation signal 332 according to the RS authentication code. The service path between the BS 33, the MS 31, and the RS 35 is built when the BS confirmation signal 332 is authenticated to be complete. It should be noted that the BS confirmation signal 332 is optional. In other words, upon the practical condition, the service path between the BS 33, the MS 31, and the RS 35 is also built when the MS acknowledgement signal 312 is authenticated to be complete.

In addition to the aforementioned functions, the RS 35 has a timer (not shown) which is started after the RS 35 receives the MS request signal 310 and stopped after the RS 35 receives the MS acknowledgement signal 312. If the RS 35 does not receive the MS acknowledgement signal 312 to stop the timer in a predetermined time period, the timer enables the RS 35 to generate and transmit a retransmitting request signal (not shown) to the MS 31. After receiving the retransmitting request signal, the MS 31 will retransmit the MS request signal 110. It should be noted that the timer within the RS 35 is optional and does not limit the present invention.

Figure 4:
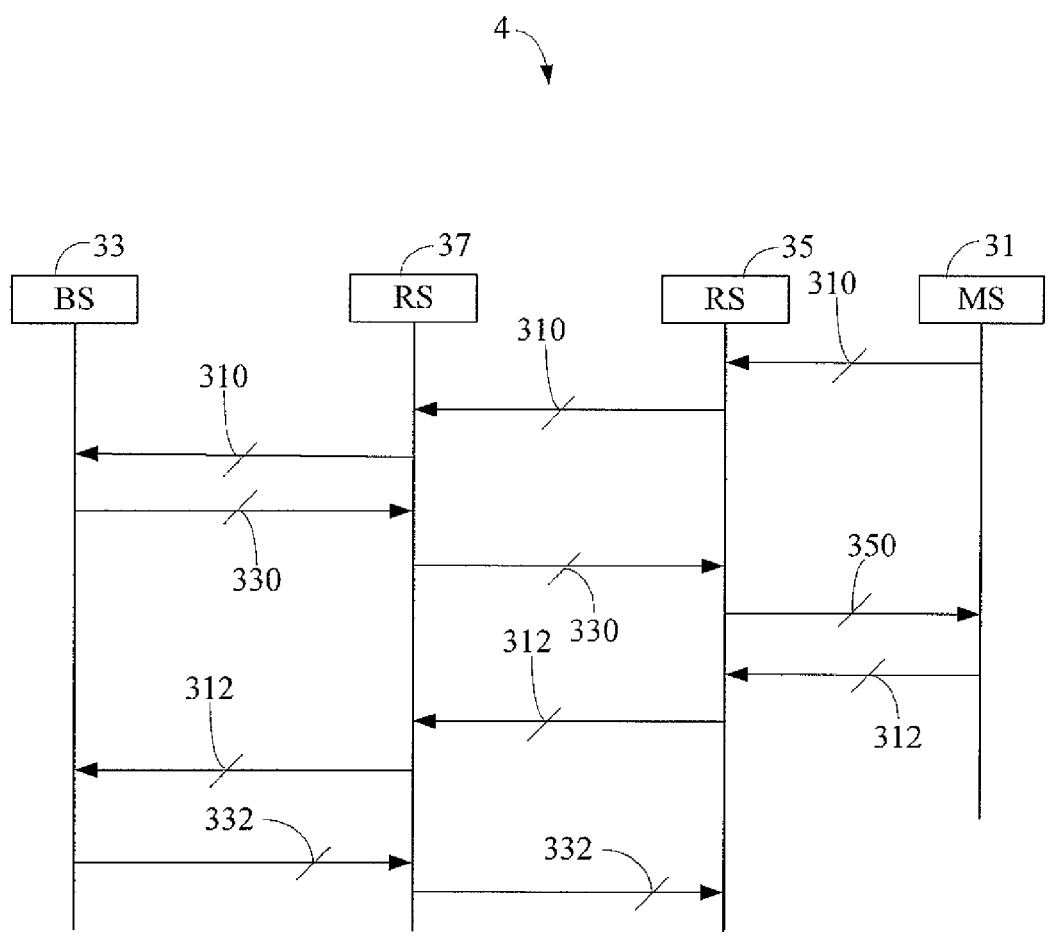
FIG. 4 is a schematic view of the fourth embodiment of the present invention.

A fourth preferred embodiment of the present invention is shown in FIG. 4, which is a communication system 4 for use in a wireless network. The communication system 4 comprises a MS 31, a BS 33, and a plurality of RSs. In this embodiment, the communication system 4 has two RSs: the RS 35 and the RS 37, but the number of the RSs does not limit the present invention. The BS 33, the RSs 35, 37, and the MS 31 have a downlink relay sequence from the BS 33 to the MS 31 and have an uplink relay sequence from the MS 31 to the BS 33.

To describe this embodiment clearly, it is assumed that the RS 37 is located within a coverage of the BS 33, the RS 35 is located within a coverage of the RS 37, and the MS 31 is located within a coverage of the RS 35. The BS 33, the RS 35, the RS 37, and the MS 31 are configured to build a service path (e.g. FTP, e-mail, and so on) via handshaking according to a plurality of control signals. Each of the control signals has an authentication code adopted to be authenticated completeness of the control signal and one of the authentication codes comprises both an RS authentication code and an MS authentication code.

When the MS 31 attempts to build the service path with the BS 33 actively, it generates an MS request signal 310 comprising the service path information for building the service path. The MS request signal 310 is one of the control signals, and the authentication code of the MS request signal 110 comprises the MS authentication code to so that the BS1 33 can authenticate completeness of the MS request signal 310. Then, the MS 31 transmits the MS request signal 310 to the RS 35 following the uplink relay sequence and containing the MS CID in the header of the MS request signal 310.

The RS 35 is configured to receive the MS request signal 310 from the MS 31 and relay it to the RS 37 following the uplink relay sequence and containing the MS CID in the header of the MS request signal 310 directly. The RS 37 is configured to receive the MS request signal 310 from the RS 35 and relay it to the BS 33 following the uplink relay sequence and containing the MS CID in the header of the MS request signal 310 directly. It means that the RS 35, RS 37 do not authenticate completeness of the MS request signal 310. The BS 33 is further configured to receive the MS request signal 310 and authenticate completeness of the MS request signal 310 according to the MS authentication code. Up to now, the BS 33 has known that the MS 31 attempts to build the service path actively. After the MS request signal 310 is authenticated to be complete, the BS 33 is further configured to generate a first BS response signal 330 and transmit the first BS response signal 330 to the RS 37 following the downlink relay sequence and containing the RS CID in the header of the first BS response signal 330. The first BS response signal 330 is one of the control signals, and the authentication code of the first BS response signal 330 comprises the RS authentication code and the MS authentication code.

After receiving the first BS response signal 330, the RS 37 is configured to authenticate completeness of the first BS response signal 330 according to the RS authentication code and relay it to the RS 35 following the downlink relay sequence and containing the RS CID in the header of the first BS response signal 330 if the first BS response signal 330 is complete. The RS 35 is configured to receive the first BS response signal 330 from the RS 37 and authenticate completeness of the first BS response signal 330 according to the RS authentication code. Since the RS 35 is the last RS in the downlink relay sequence, it removes the RS authentication code from the first BS response signal 330 and generates a second BS response signal 350 comprising the MS authentication code. The second BS response signal 350 is also one of the control signals. After generating the second BS response signal 350, the RS 35 is further configured to transmit the second BS response signal 350 to the MS 31 containing the MS CID in the header of the second BS response signal 350.

The MS 31 is further configured to receive the second BS response signal 350 from the RS 35 and authenticate completeness of the second BS response signal 350 according to the MS authentication code. By receiving the complete second BS response signal 350, the MS 31 knows that the BS 33 has received the MS request signal 310. The MS 31 further generates an MS acknowledgement signal 312 and transmits the MS acknowledgement signal 312 to the RS 35 following the uplink relay sequence and containing the MS CID in the header of the MS acknowledgement signal 312. The MS acknowledgement signal 312 is one of the control signals and the authentication code of the MS acknowledgement signal 312 comprises the MS authentication code, which can only be parsed by the BS 33.

The RS 35 is configured to receive the MS acknowledgement signal 312 and relay it to the RS 37 following the uplink relay sequence and containing the MS CID in the header of the MS acknowledgement signal 312 directly. The RS 37 is configured to receive the MS acknowledgement signal 312 from the RS 35 and relay it to the BS 33 following the uplink relay sequence and containing the MS CID in the header of the MS acknowledgement signal 312 directly. It means that the RS 35, 37 do not authenticate completeness of the MS acknowledgement signal 312 because they can not parse the MS authentication code. The BS 33 is further configured to receive the acknowledgement signal 312 from the RS 37 and to authenticate completeness of the acknowledgement signal 312 according to the MS authentication code.

In this embodiment, the BS 33 is further configured to generate and transmit a BS confirmation signal 332 comprising the RS authentication code to the RS 37 following the downlink relay sequence when the MS acknowledgement signal 312 is complete. The RS 37 is further configured to receive the BS confirmation signal 332 from the BS 33, authenticate completeness of the BS confirmation signal 332 according to the RS authentication code, and relay the BS confirmation signal 332 to the RS 35 following the downlink relay sequence.

The RS 35 is further configured to receive the BS confirmation signal 332 from the RS 37, authenticate completeness of the BS confirmation signal 332 according to the RS authentication code. The service path between the BS 33, the MS 31, the RS 35, and the RS 37 is built when the BS confirmation signal 332 is authenticated to be complete. It should be noted that the BS confirmation signal 332 is optional. In other words, upon the practical condition, the service path between the BS 33, the MS 31, the RS 35, and the RS 37 is also built when the MS acknowledgement signal 312 is authenticated to be complete.

In addition to the aforementioned functions, each of the RS 35 and the RS 37 has a timer (not shown) which is respectively started after the RS 35 and the RS 37 receive the MS request signal 310 and stopped after the RS 35 and the RS 37 receives the MS acknowledgement signal 312. If the RS 35 and/or the RS 37 does not receive the MS acknowledgement signal 312 to stop the timer in a predetermined time period, the timer enables the corresponding RS to generate and transmit a retransmitting request signal (not shown) to the MS 31. After receiving the retransmitting request signal, the MS 31 will retransmit the MS request signal 310. It should be noted that the timers within the RSs are optional and do not limit the present invention.

Figure 5:
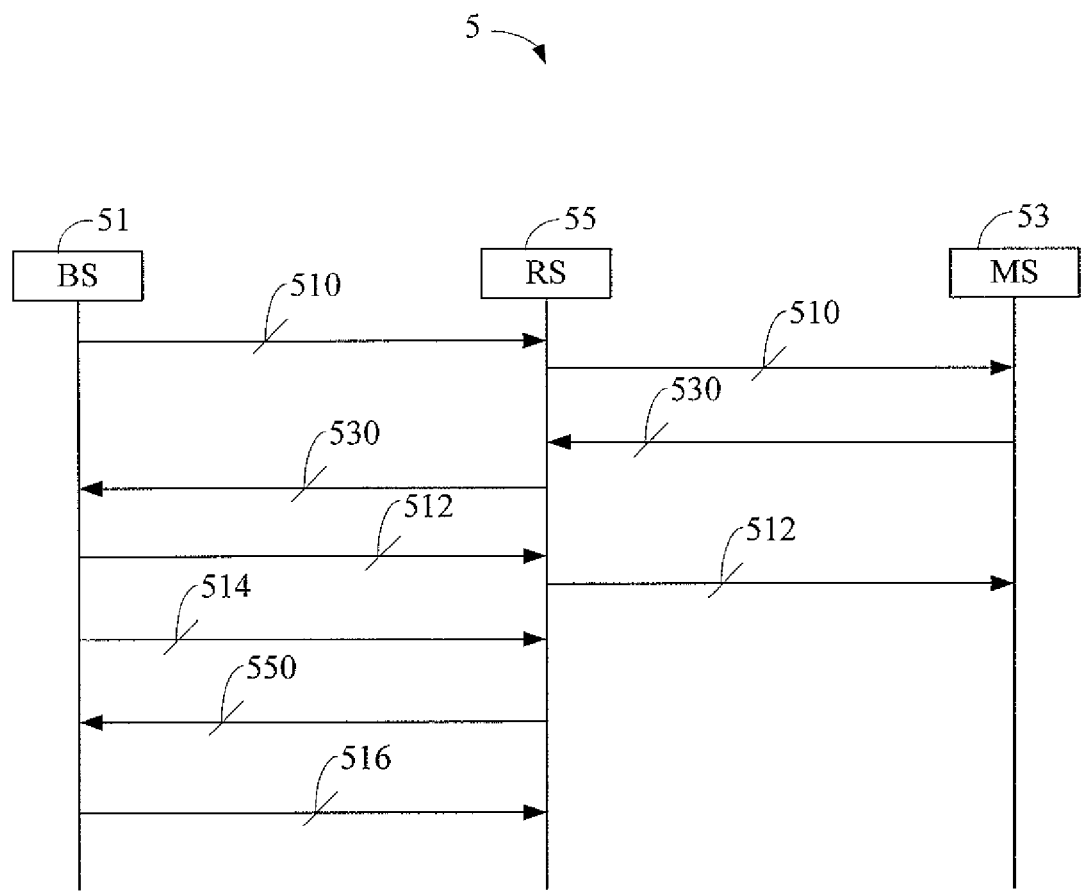
FIG. 5 is a schematic view of the fifth embodiment of the present invention.

A fifth preferred embodiment of the present invention is shown in FIG. 5, which is a communication system 5 for use in a wireless network. The communication system 5 comprises a BS 51, an RS 55, and an MS 53. To describe this embodiment clearly, it is assumed that the RS 55 is located within a coverage of the BS 51, and the MS 53 is located within a coverage of the RS 55. The BS 51, the RS 55, and the MS 53 are configured to build a service path (e.g. FTP, e-mail, and so on) via handshaking according to a plurality of control signals. Each of the control signals has an authentication code adopted to be authenticated completeness of the control signal.

The BS 51, the RS 55, and the MS 53 have a downlink relay sequence from the BS 51 to the MS 53 and an uplink relay sequence from the MS 53 to the BS 51. Both the downlink relay sequence and the uplink sequence will be referenced later.

When the BS 51 attempts to build the service path with the MS 53 actively, it generates a first BS request signal 510 comprising the service path information for building the service path. The first BS request signal 510 is one of the control signals, and the authentication code of the first BS request signal 510 comprises an MS authentication code so that the MS 53 can authenticate completeness of the BS request signal. It should be noted that the MS authentication code is only parsed by the MS 53. The BS 510 transmits the first BS request signal 510 to the RS 55 following the downlink relay sequence and containing the MS CID in the header of the first BS request signal 510 firstly because the MS 53 is not in the coverage of the BS 51.

After receiving the first BS request signal 510, the RS 55 just relays it to the MS 53 following the downlink relay sequence and containing the MS CID in the header of the first BS request signal 510, but does not authenticate completeness of the first BS request signal 510 because the RS 55 can not parse the MS authentication code. The MS 53 is configured to receive the first BS request signal 510 from the RS 55, authenticate completeness of the first BS request signal 510 according to the MS authentication code, generate an MS response signal 530 comprising the MS authentication code if the first BS request signal 510 is complete, and transmit the MS response signal 530 to the RS 55 following the uplink relay sequence and containing the MS CID in the header of the MS response signal 530. Similarly, the MS authentication code in the MS response signal 530 is only parsed by the BS 51.

After receiving the MS response signal 530, the RS 55 just relays it to the BS 51 following the uplink relay sequence and containing the MS CID in the header of the MS response signal 530. The RS 55 does not authenticate completeness of the MS response signal 530 because the RS 55 can not parse the BS authentication code. The BS 51 is further configured to receive the MS response signal 530, authenticate completeness of the MS response signal 530, generate a first BS acknowledgement signal 512 if the MS response signal 530 is complete, and transmit the first BS acknowledgement signal 512 to the RS 55 following the downlink relay sequence and containing the MS CID in the header of the first BS acknowledgement signal 512. The RS 55 does not authenticate completeness of the first BS acknowledgement signal 512 and relays the first BS acknowledgement signal 512 to the MS 53 following the downlink relay sequence.

The BS 51 also generates a second BS request signal 514 to the RS 55 containing the RS CID in the header of the second BS request signal 514. The second BS request signal 514 comprises the service path information for building the service path. The authentication code of the second BS request signal 514 comprises the RS authentication code. The RS 55 is further configured to authenticate completeness of the second BS request signal 514 according to the RS authentication code.

The RS 55 is further configured to generate an RS response signal 550 comprising the RS authentication code and transmit the RS response signal 550 to the BS 51 containing the RS CID in the header of the RS response signal 550 when the second BS request signal 514 is complete. The BS 51 is further configured to transmit a BS acknowledgement signal 516 comprising the RS authentication code to the RS 55 containing the RS CID in the header of the BS acknowledgement signal 516 when the RS response signal 550 is complete according to the RS authentication code. The service path is build when the RS 55 receives the BS acknowledgement signal 516 and authenticates the BS acknowledgement signal 516 to be complete according to the RS authentication code.

Figure 6:
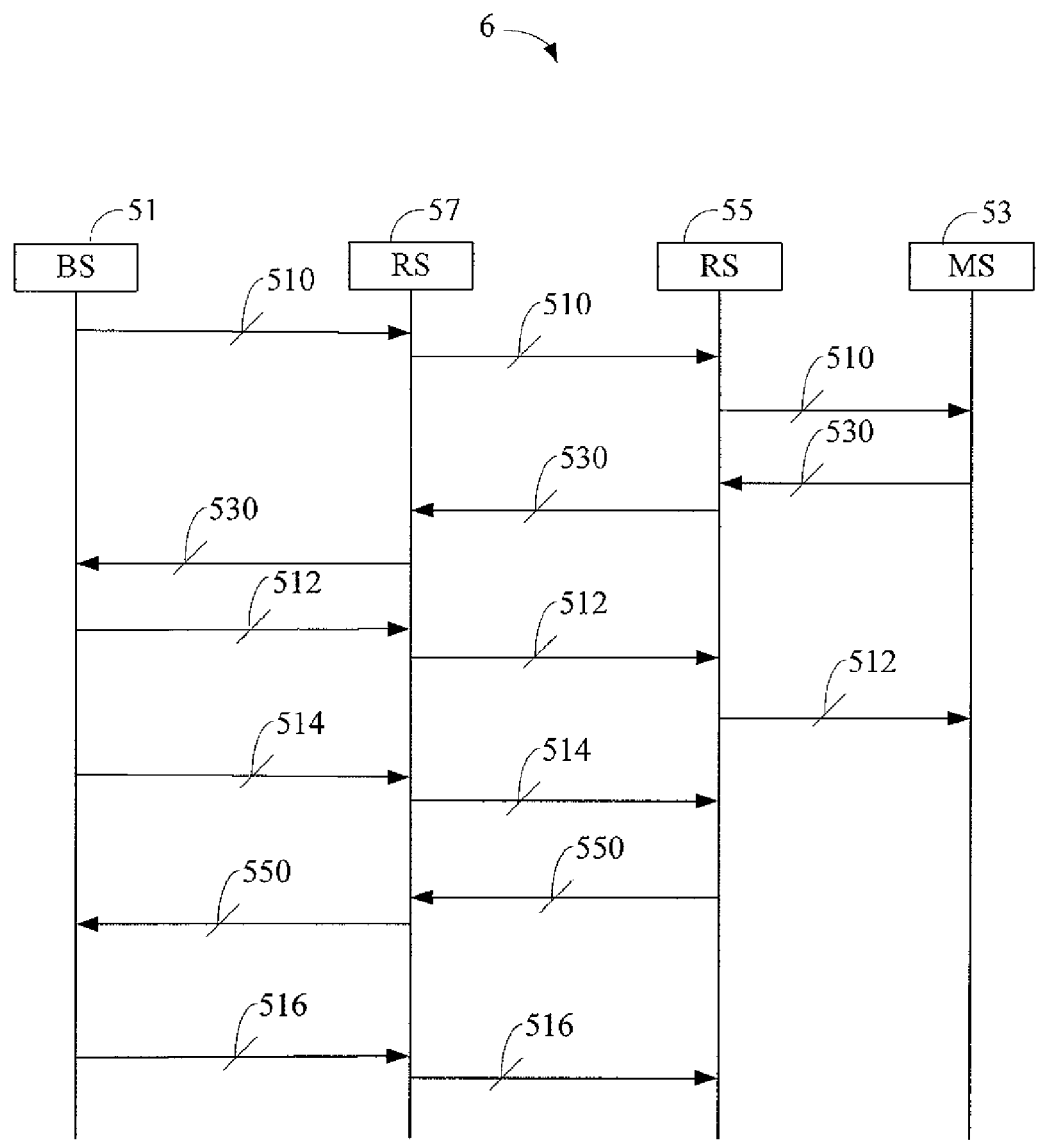
FIG. 6 is a schematic view of the sixth embodiment of the present invention.

A sixth preferred embodiment of the present invention is shown in FIG. 6, which is a communication system 6 for use in a wireless network. The communication system 6 comprises a BS 51, RS 55, RS 57, and an MS 53. To describe this embodiment clearly, it is assumed that the RS 57 is located within a coverage of the BS 51, the RS 55 is located within a coverage of the RS 57, and the MS 53 is located within a coverage of the RS 55. The BS 51, the RS 55, RS 57, and the MS 53 are configured to build a service path (e.g. FTP, e-mail, and so on) via handshaking according to a plurality of control signals. Each of the control signals has an authentication code adopted to be authenticated completeness of the control signal.

The operations of the BS 51, the RS 55, and the MS 53 in the communication system 6 that are the same in the aforementioned communication system 5 are not repeated again. In the following, only the differences between the communication system 6 and the communication system 5 are described.

Comparing with the aforementioned communication system 5, the communication system 6 has the RS 57 between the BS 51 and the RS 55. The RS 57 is configured to relay the first BS request signal 510 from the BS 51 to the RS 55, relay the MS response signal 530 from the RS 55 to the BS 51, relay the first BS acknowledgement signal 512 from the BS 51 to the RS 55, relay the second BS request signal 514 from the BS 51 to the RS 55, relay the RS response signal 550 from the RS 55 to the BS 51, and relay the BS acknowledgement signal 516 from the BS 51 to the RS 55, when the aforementioned control signals are authenticated to be complete.

Figure 7:
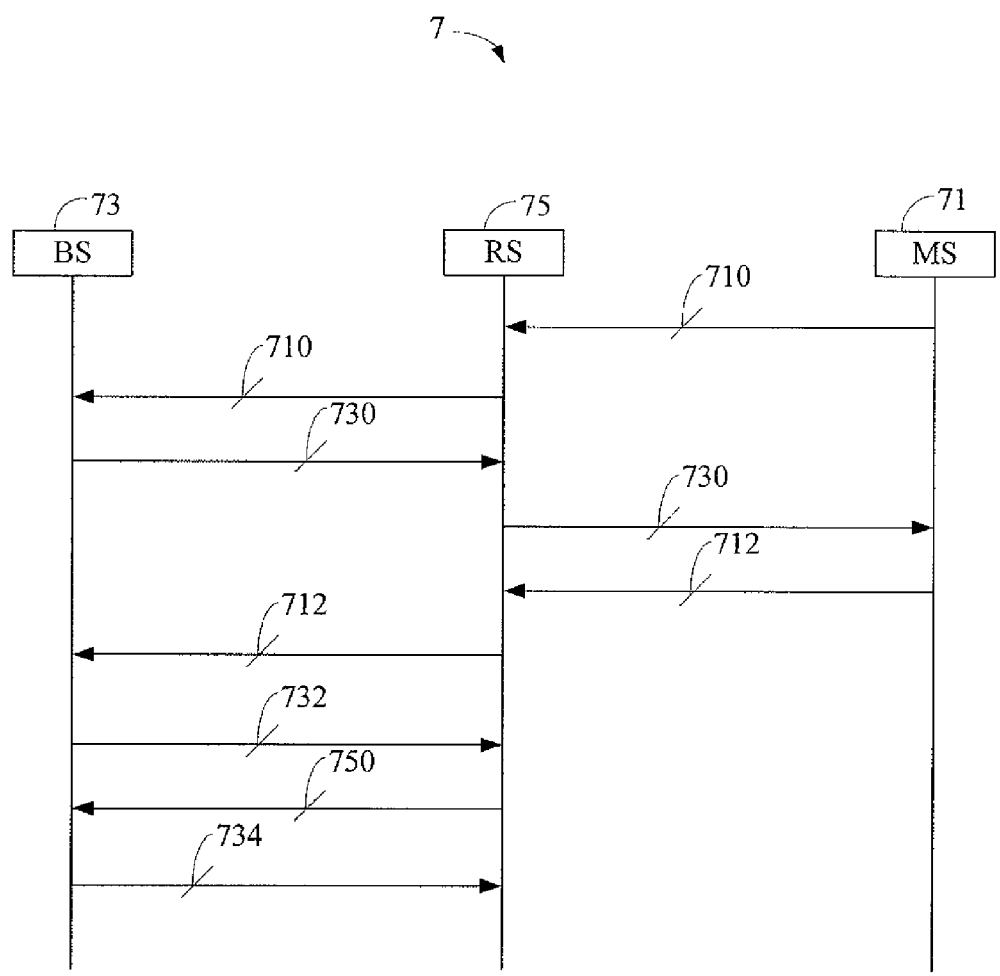
FIG. 7 is a schematic view of the seventh embodiment of the present invention.

A seventh preferred embodiment of the present invention is shown in FIG. 7, which is a communication system 7 for use in a wireless network. The communication system 7 comprises a BS 73, an RS 75, and an MS 71. To describe this embodiment clearly, it is assumed that the RS 75 is located within a coverage of the BS 73, and the MS 71 is located within a coverage of the RS 75. The BS 73, the RS 75, and the MS 71 are configured to build a service path (e.g. FTP, e-mail, and so on) via handshaking according to a plurality of control signals. Each of the control signals has an authentication code adopted to be authenticated completeness of the control signal.

The BS 73, the RS 75, and the MS 71 have a downlink relay sequence from the BS 73 to the MS 71 and an uplink relay sequence from the MS 71 to the BS 73. Both the downlink relay sequence and the uplink sequence will be referenced later.

More particularly, when the MS 71 attempts to build the service path with the BS 73 actively, it generates an MS request signal 710 comprising the service path information for building the service path. The MS request signal 710 is one of the control signals, and the authentication code of the MS request signal 710 comprises an MS authentication code so that the BS 73 can authenticate completeness of the MS request signal 710. Then, the MS 71 transmits the MS request signal 710 to the RS 75 following the uplink relay sequence and containing the MS CID in the header of the MS request signal 710 firstly because the BS 53 is not in the coverage of the MS 71.

After receiving the MS request signal 710, the RS 75 just relays it to the BS 73 following the uplink relay sequence and containing the MS CID in the header of the MS request signal 710. The RS 75 does not authenticate completeness of the MS request signal 710 because the RS 75 can not parse the MS authentication code. The BS 73 is configured to receive the MS request signal 710 from the RS 75, authenticate completeness of the MS request signal 710 according to the MS authentication code, generate a BS response signal 730 comprising the MS authentication code if the MS request signal 710 is complete, and transmit the BS response signal 730 to the RS 75 following the downlink relay sequence containing the MS CID in the header of the BS response signal 730. Similarly, the MS authentication code is only parsed by the MS 71.

After receiving the BS response signal 730, the RS 75 just relays it to the MS 71 following the downlink relay sequence and containing the MS CID in the header of the BS response signal 730. The RS 75 does not authenticate completeness of the BS response signal 730 because the RS 75 can not parse the MS authentication code. The MS 71 is further configured to receive the BS response signal 730, authenticate completeness of the MS response signal 730, generate an MS acknowledgement signal 712 if the BS response signal 730 is complete, and transmit the MS acknowledgement signal 712 to the RS 75 following the uplink relay sequence and containing the MS CID in the header of the MS acknowledgement signal 712. The RS 75 does not authenticate completeness of the MS acknowledgement signal 712 and relays the MS acknowledgement signal 712 to the BS 73 following the uplink relay sequence and containing the MS CID in the header of the MS acknowledgement signal 712.

The BS 73 also generates a BS request signal 732 and transmits the BS request signal 732 to the RS 75 following the downlink relay sequence and containing the RS CID in the header of the BS request signal 732. The BS request signal 732 comprises the service path information for building the service path and the authentication code of the BS request signal 732 comprises the RS authentication code. The RS 75 is further configured to authenticate completeness of the BS request signal 732 according to the RS authentication code.

The RS 75 is further configured to generate an RS response signal 750 comprising the RS authentication code and transmit the RS response signal 750 to the BS 73 following the uplink relay sequence and containing the RS CID in the header of the RS response signal 750 when the BS request signal 732 is complete. The BS 73 is further configured to transmit a BS acknowledgement signal 734 comprising the RS authentication code to the RS 75 following the downlink relay sequence and containing the RS CID in the header of the BS acknowledgement signal 734 when the RS response signal 750 is complete according to the RS authentication code. The service path is build when the RS 75 receives the BS acknowledgement signal 734 and authenticates the BS acknowledgement signal 734 is complete according to the RS authentication code.

Figure 8:
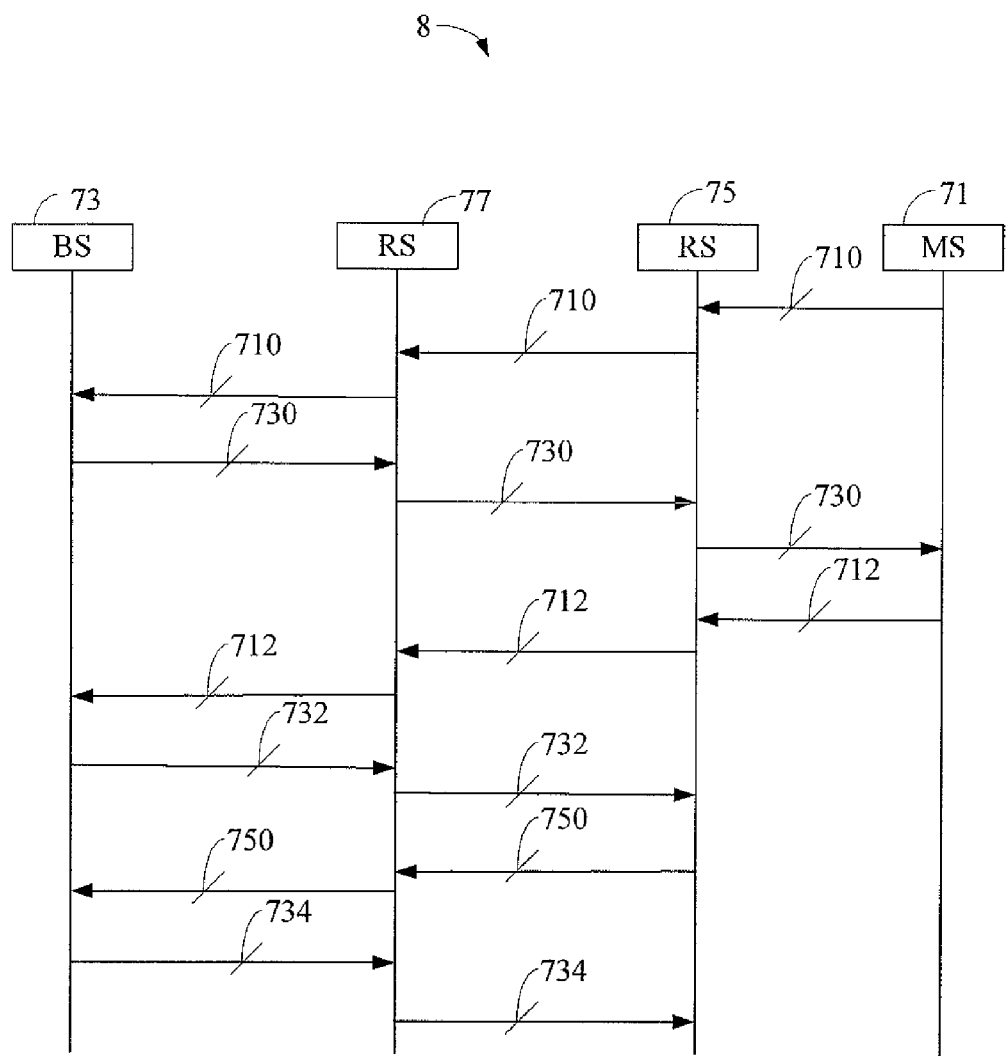
FIG. 8 is a schematic view of the eighth embodiment of the present invention.

An eighth preferred embodiment of the present invention is shown in FIG. 8, which is a communication system 8 for use in a wireless network. The communication system 8 comprises an MS 71, an RS 75, an RS 77, and a BS 73. To describe this embodiment clearly, it is assumed that the RS 77 is located within a coverage of the BS 73, the RS 75 is located within a coverage of the RS 77, and the MS 71 is located within a coverage of the RS 75. The MS 71, the RS 75, the RS 77, and the BS 73 are configured to build a service path (e.g. FTP, e-mail, and so on) via handshaking according to a plurality of control signals. Each of the control signals has an authentication code adopted to be authenticated completeness of the control signal.

The operations of the MS 71, the RS 75, the RS 77, and the BS 73 in the communication system 8 that are the same as those in the aforementioned communication system 7 are not repeated again. In the following, only the differences between the communication system 8 and the communication system 7 are described.

Comparing with the aforementioned communication system 7, the communication system 8 has the RS 77 between the BS 73 and the RS 75. The RS 77 is configured to relay the MS request signal 710 from the RS 75 to the BS 73, relay the BS response signal 730 from the BS 73 to the RS 75, relay the MS acknowledgement signal 712 from the RS 75 to the BS 73, relay the BS request signal 732 from the BS 73 to the RS 75, relay the RS response signal 750 from the RS 75 to the BS 73, and relay the BS acknowledgement signal 734 from the BS 73 to the RS 75 when the aforementioned control signals are complete.

Figure 9:
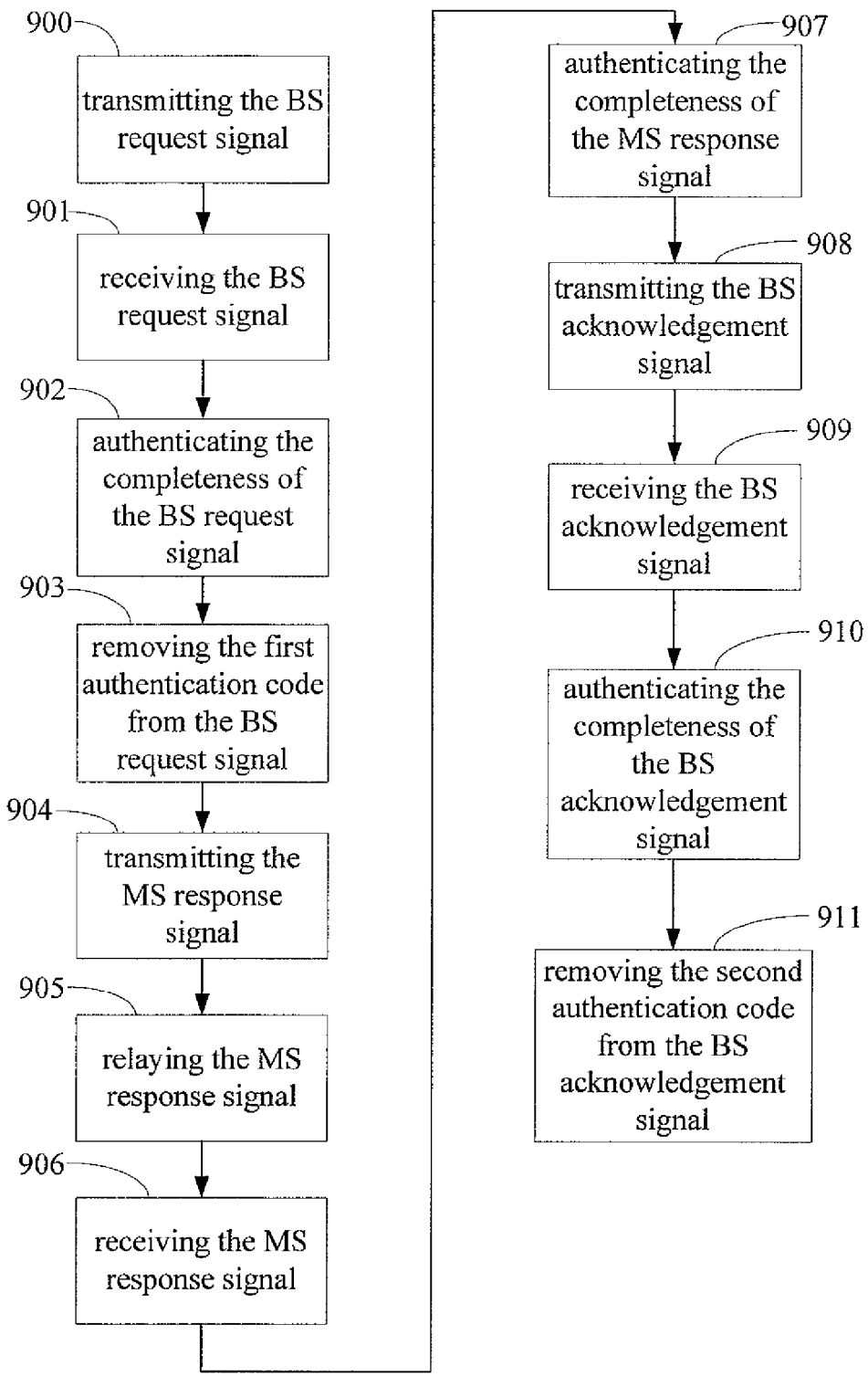
FIG. 9 is a flow chart of the ninth embodiment of the present invention.

A ninth preferred embodiment of the present invention is shown in FIG. 9, which illustrates a handshake method for building a service path in a communication system for use in a wireless network. First, step 900 is executed to transmit a BS request signal comprising an RS authentication code and an MS authentication code, wherein both of them are adopted to authenticate completeness of the BS request signal. Step 901 is executed to receive the BS request signal. Step 902 is executed to authenticate completeness of the BS request signal according to the RS authentication code. Step 903 is executed to remove the RS authentication code from the BS request signal. In other words, steps 900 to 903 are executed to transmit the BS request signal comprising the RS authentication code and the MS authentication code to an MS.

Step 904 is executed to transmit a MS response signal comprising the MS authentication code when the BS request signal is complete, wherein the MS authentication code is adopted to authenticate completeness of the MS response signal. Step 905 is executed to relay the MS response signal according to an uplink relay sequence of the communication system. Step 906 is executed to receive the MS response signal. Step 907 is executed to authenticate completeness of the MS response signal according to the MS authentication code. In summary, steps 904 to 907 are executed to transmit the MS response signal comprising the MS authentication code to the BS which transmitted BS request signal when the BS request signal is authenticated to be complete.

Step 908 is executed to transmit a BS acknowledgement signal comprising the RS authentication code and the MS authentication code when the MS response signal is complete, wherein the RS authentication code and the MS authentication code are adopted to authenticate completeness of the BS acknowledgement signal. Step 909 is executed to receive the BS acknowledgement signal. Step 910 is executed to authenticate completeness of the BS acknowledgement signal according to the one of the RS authentication code. Step 911 is executed to remove the RS authentication code from the BS acknowledgement signal. In other words, steps 908 to 911 are executed to transmit the BS acknowledgement signal comprising the RS authentication code and the MS authentication code to the MS when the MS response signal is complete.

In addition to the aforementioned steps, the ninth preferred embodiment is able to execute all the functions and operations recited in the first and the second preferred embodiments.

Figure 10:
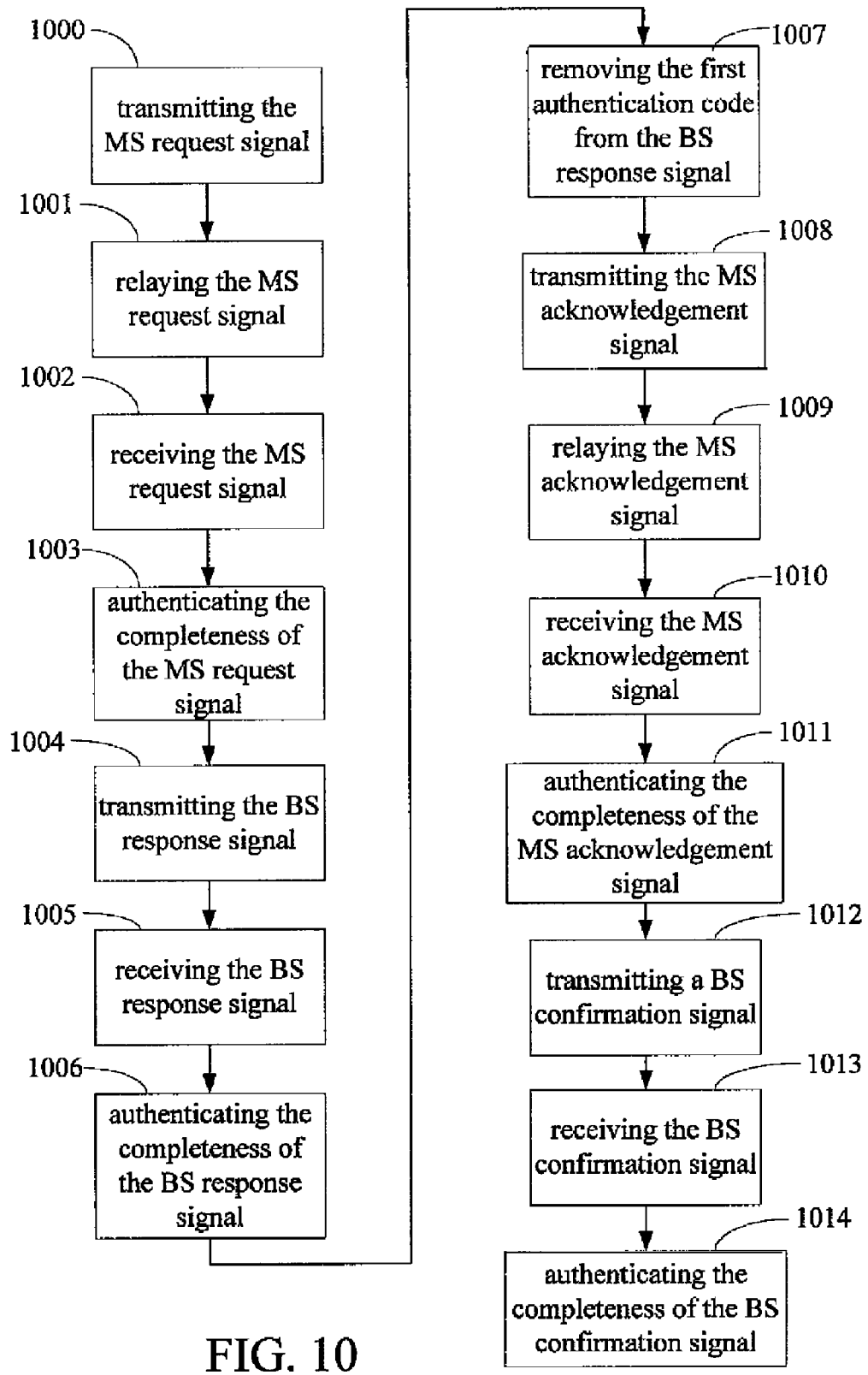
FIG. 10 is a flow chart of the tenth embodiment of the present invention.

A tenth preferred embodiment of the present invention is shown in FIG. 10, which illustrates a handshake method for building a service path in a communication system for use in a wireless network. First, step 1000 is executed to transmit an MS request signal comprising an MS authentication code, wherein the MS authentication code is adopted to authenticate completeness of the MS request signal. Step 1001 is executed to relay the MS request signal according to an uplink relay sequence of the communication system. Step 1002 is executed to receive the MS request signal. Step 1003 is executed to authenticate completeness of the MS request signal according to the MS authentication code in the MS request signal. In other words, steps 1000 to 1003 are executed to transmit the MS request signal comprising the MS authentication code to a BS of the communication system. The MS authentication code is adopted to authenticate completeness of the MS request signal.

Step 1004 is executed to transmit a BS response signal comprising the RS authentication code and the MS authentication code when the MS request signal is authenticated to be complete. Step 1005 is executed to receive the BS response signal. Step 1006 is executed to authenticate completeness of the BS response signal according to the RS authentication code. Step 1007 is executed to remove the RS authentication code from the BS response signal. In other words, steps 1004 to 1007 are executed to transmit the BS response signal comprising the RS authentication code and the MS authentication code to the MS which transmitted the MS request signal when the MS request signal is authenticated to be complete. The RS authentication code and the MS authentication code and are adopted to authenticate completeness of the BS response signal. In other words, step 1004 to step 1007 are executed to transmit the BS response signal to the MS.

Step 1008 is executed to transmit an MS acknowledgement signal comprising the MS authentication code to the BS when the BS response signal is complete. Step 1009 is executed to relay the MS acknowledgement signal. Step 1010 is executed to receive the MS acknowledgement signal. Step 1011 is executed to authenticate completeness of the MS acknowledgement signal according to the MS authentication code. In other words, steps 1008 to 1011 are executed to transmit the MS acknowledgement signal comprising the MS authentication code to the BS when the BS response signal is complete. The MS authentication code is adopted to authenticate completeness of the MS acknowledgement signal.

Step 1012 is executed to transmit a BS confirmation signal comprising the RS authentication code when the MS acknowledgement signal is complete. Step 1013 is executed to receive the BS confirmation signal. Step 1014 is executed to authenticate completeness of the BS confirmation signal according to the RS authentication code. In other words, steps 1012 to 1014 are executed to transmit the BS confirmation signal comprising the RS authentication code to the RS when the MS acknowledgement signal is complete. The RS authentication code is adopted to authenticate completeness of the BS confirmation signal.

In addition to the aforementioned steps, the tenth preferred embodiment is able to execute all the functions and operations recited in the third and the fourth preferred embodiments.

Figure 11A:
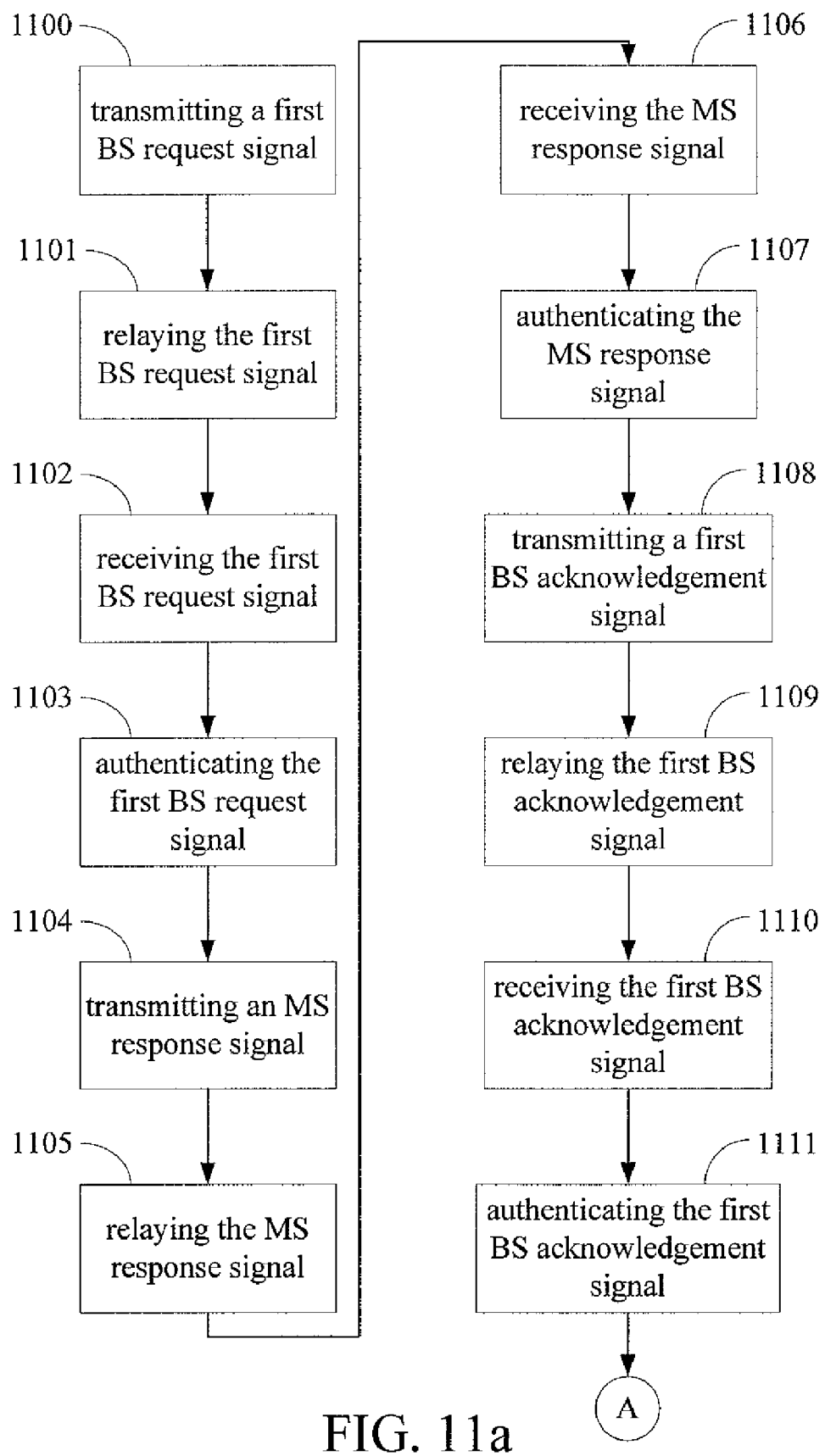
FIG. 11a is a partial flow chart of the eleventh embodiment of the present invention.
Figure 11B:
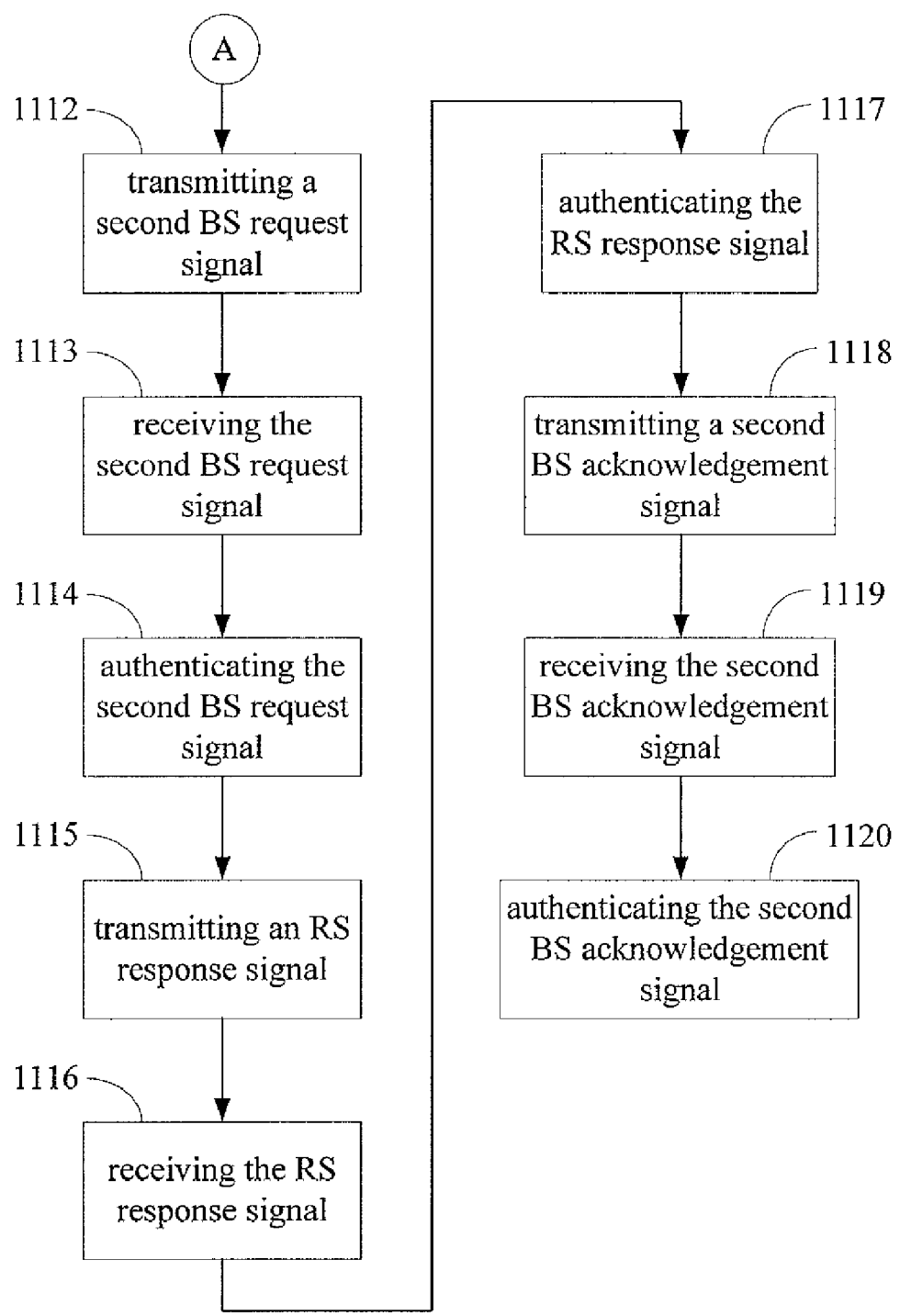
FIG. 11b is a partial flow chart of the eleventh embodiment of the present invention.

An eleventh preferred embodiment of the present invention is shown in FIG. 11*a* and FIG. 11*b*, which illustrate a handshake method for building a service path in a communication system for use in a wireless network. Please refer to FIG. 11*a*, step 1100 is executed to transmit a first BS request signal comprising an MS authentication code. Step 1101 is executed to relay the first BS request signal according to a downlink relay sequence of the communication system. Step 1102 is executed to receive the first BS request signal. Step 1103 is executed to authenticate completeness of the first BS request signal according to the MS authentication code.

Step 1104 is executed to transmit an MS response signal comprising the MS authentication code when the first BS request signal is complete. Step 1105 is executed to relay the MS response signal according to an uplink relay sequence of the communication system. Step 1106 is executed to receive the MS response signal. Step 1107 is executed to authenticate completeness of the MS response signal according to the MS authentication code.

Step 1108 is executed to transmit a first BS acknowledgement signal comprising the MS authentication code when the MS response signal is complete. Step 1109 is executed to relay the first BS acknowledgement signal according to the downlink relay sequence. Step 1110 is executed to receive the first BS acknowledgement signal. Step 1111 is executed to authenticate completeness of the first BS acknowledgement signal according to the MS authentication code.

Please refer to FIG. 11*b*, step 1112 is executed to transmit a second BS request signal comprising the RS authentication code. Step 1113 is executed to receive the second BS request signal. Step 1114 is executed to authenticate completeness of the second BS request signal according to the RS authentication code.

Step 1115 is executed to transmit an RS response signal comprising the KS authentication code when the second BS request signal is complete. Step 1116 is executed to receive the RS response signal. Step 1117 is executed to authenticate completeness of the RS response signal according to the RS authentication code.

Step 1118 is executed to transmit a second BS acknowledgement signal comprising the RS authentication code when the RS response signal is complete. Step 1119 is executed to receive the second BS acknowledgement signal. Step 1120 is executed to authenticate completeness of the second BS acknowledgement signal according to the RS authentication code.

In addition to the aforementioned steps, the eleventh preferred embodiment is able to execute all the functions and operations recited in the fifth and sixth preferred embodiments.

Figure 12A:
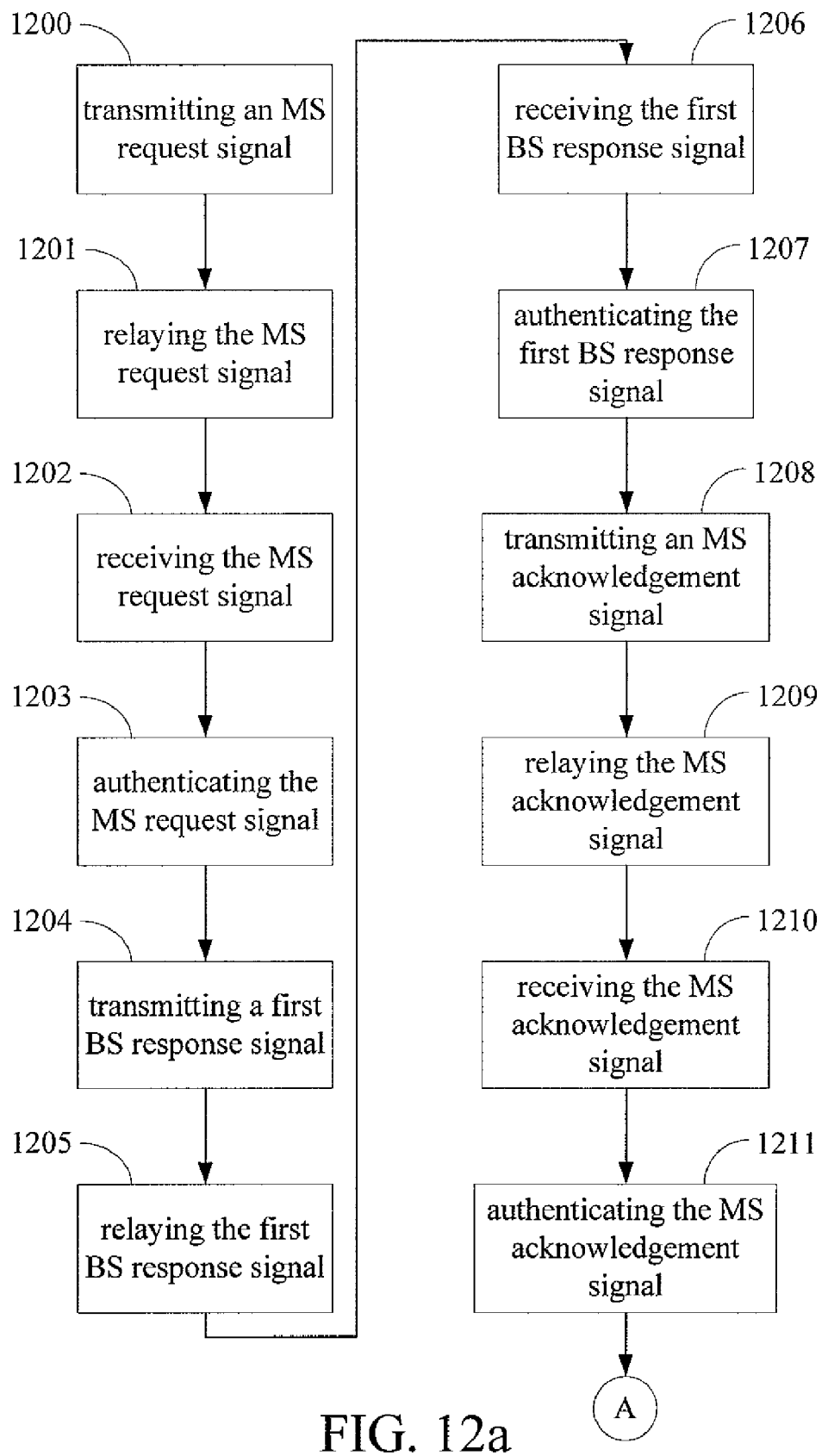
FIG. 12a is a partial flow chart of the twelfth embodiment of the present invention.
Figure 12B:
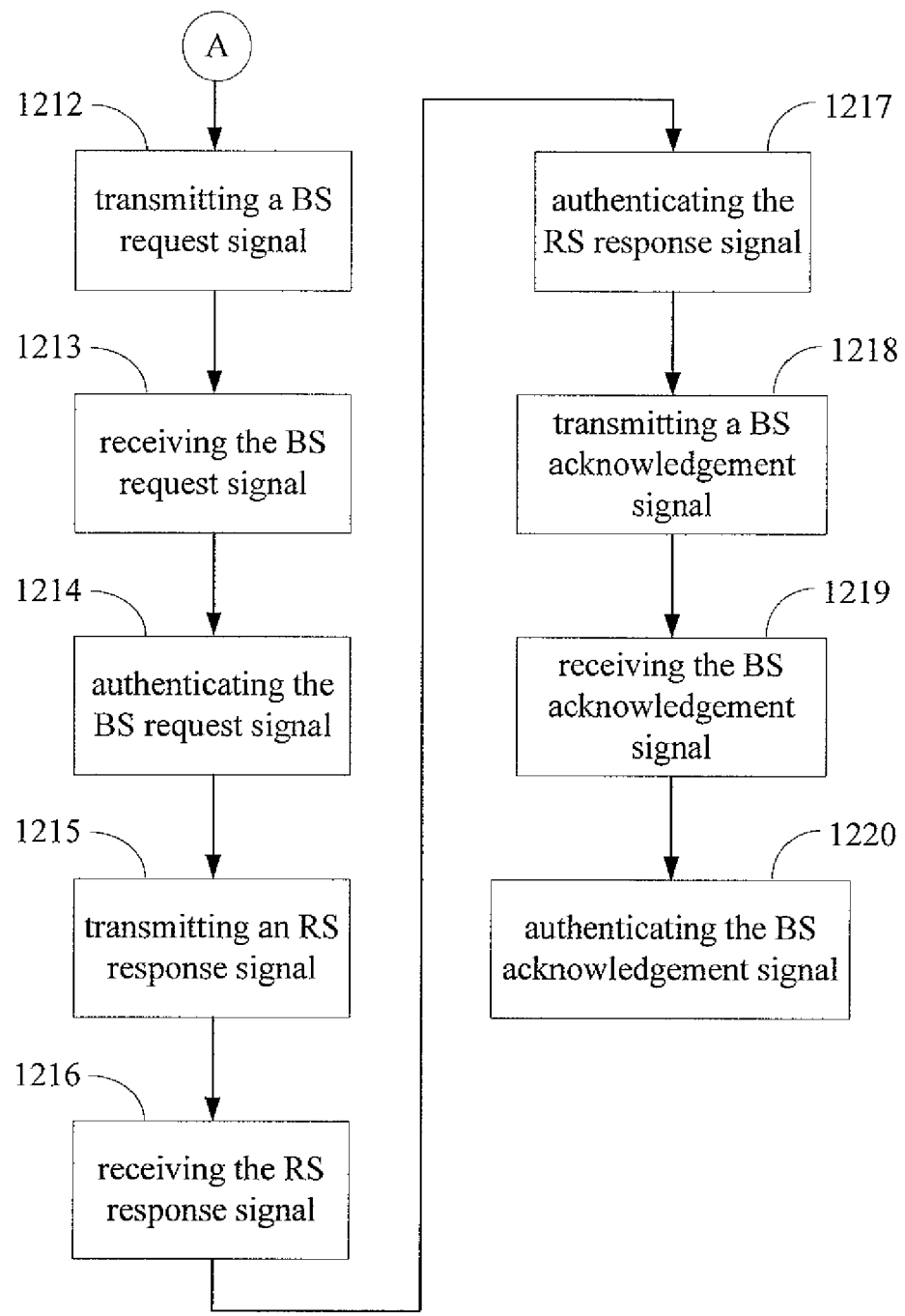
FIG. 12b is a partial flow chart of the twelfth embodiment of the present invention.

A twelfth preferred embodiment of the present invention is shown in FIG. 12*a* and FIG. 12*b*, which illustrate a handshake method for building a service path in a communication system for use in a wireless network. Please refer to FIG. 12*a*, step 1200 is executed to transmit an MS request signal comprising an MS authentication code. Step 1201 is executed to relay the MS request signal according to an uplink relay sequence of the communication system. Step 1202 is executed to receive the MS request signal. Step 1203 is executed to authenticate completeness of the MS request signal according to the MS authentication code.

Step 1204 is executed to transmit a BS response signal comprising the MS authentication code when the MS request signal is complete. Step 1205 is executed to relay the BS response signal according to a downlink relay sequence of the communication system. Step 1206 is executed to receive the BS response signal. Step 1207 is executed to authenticate completeness of the BS response signal according to the MS authentication code.

Step 1208 is executed to transmit an MS acknowledgement signal comprising the MS authentication code when the BS response signal is complete. Step 1209 is executed to relay the MS acknowledgement signal according to the uplink relay sequence. Step 1210 is executed to receive the MS acknowledgement signal. Step 1211 is executed to authenticate completeness of the MS acknowledgement signal according to the MS authentication code.

Please refer to FIG. 12*b*, step 1212 is executed to transmit a BS request signal comprising the RS authentication code. Step 1213 is executed to receive the BS request signal. Step 1214 is executed to authenticate completeness of the BS request signal according to the RS authentication code.

Step 1215 is executed to transmit an RS response signal comprising the RS authentication code when the BS request signal is complete. Step 1216 is executed to receive the RS response signal. Step 1217 is executed to authenticate completeness of the RS response signal according to the RS authentication code.

Step 1218 is executed to transmit a BS acknowledgement signal comprising the RS authentication code when the RS response signal is complete. Step 1219 is executed to receive the BS acknowledgement signal. Step 1220 is executed to authenticate completeness of the BS acknowledgement signal according to the RS authentication code.

In addition to the aforementioned steps, the twelfth preferred embodiment is able to execute all the functions and operations recited in the seventh and eighth preferred embodiments.

According to the aforementioned descriptions, when the BS, RS (or RSs), and MS in the same transmission (relay) path have the new service path build via handshaking according to the control signals, they can authenticate completeness of the control signals according to the corresponding authentication code. More particularly, at least one of the authentication codes of the control signals comprises both an RS authentication code and an MS authentication code. By doing so, the BS or MS attempting to build the new service path does not need to transmit the control messages with the same information to the RSs or the MS twice to authenticate. The present invention can effectively solve the problem that the BS, RSs, and MSs along the same transmission (relay) path can not authenticate completeness of the control signal due to lack the right authentication code.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication system for use in a wireless network, the communication system having a service path and comprising:

a base station (BS);

a plurality of relay stations (RSs), one of the RSs being located within a coverage of the BS; and a mobile station (MS) being located within a coverage of one of the RSs;

wherein the BS, the RSs, and the MS have a downlink relay sequence from the BS to the MS and are configured to build the service path via handshaking according to a plurality of control signals, each of the control signals has an authentication code adopted to be authenticated completeness of the corresponding control signal:

wherein one of the control signals is a first BS request signal, the authentication code of the first BS request signal comprises an RS authentication code and an MS authentication code, the BS is further configured to generate the first BS request signal and transmit the first BS request signal to the next RS following the downlink relay sequence, each of the RSs is further configured to receive the first BS request signal and to authenticate completeness of the first BS request signal according to the RS authentication code, the last RS in the downlink relay sequence is configured to remove the RS authentication code from the first BS request signal, generate a second BS request signal comprising the MS authentication code, and transmit the second BS request signal to the MS, wherein the second BS request signal is one of the control signals, and the MS is further configured to receive the second BS request signal from the last RS in the downlinks relay sequence, and authenticate completeness of the second BS request signal according to the MS authentication code.

2. The communication system as claimed in claim 1, wherein the BS, the RSs, and the MS have an uplink relay sequence from the MS to the BS, one of the control signals is an MS response signal, the authentication code of the MS response signal comprises the MS authentication code, the MS is further configured to generate and transmit the MS response signal;

the RSs are further configured to relay the MS response signal to the BS following the uplink relay sequence; and the BS is further configured to receive the MS response signal and to authenticate completeness of the MS response signal according to the MS authentication code.

3. The communication system as claimed in claim 2, wherein one of the control signals is a first BS acknowledgement signal, the authentication code of the first BS acknowledgement signal comprises the RS authentication code and the MS authentication code;

the BS is further configured to generate the first BS acknowledgement signal and transmit the first BS request signal to the next RS following the downlink relay sequence;

each of the RSs is further configured to receive the first BS acknowledgement signal and to authenticate completeness of the first BS acknowledgement signal according to the RS authentication code, the last RS in the downlink relay sequence is configured to remove the RS authentication code from the first BS acknowledgement signal, and generate a second BS acknowledgement signal comprising the MS authentication code, and transmit the second BS acknowledgement signal to the MS, wherein the second BS acknowledge signal is one of the control signals; and the MS is further configured to receive the second BS acknowledgement signal from the last RS in the downlink relay sequence and authenticate completeness of the second BS acknowledgement signal according to the MS authentication code.

4. The communication system as claimed in claim 1, wherein the BS, the RSs, and the MS have an uplink relay sequence from the MS to the BS;

one of the control signals is an MS request signal, the authentication code of the MS request signal comprises the MS authentication code;

the MS is further configured to generate and transmit the MS request signal;

the RSs are further configured to relay the MS request signal from the MS to the BS following the uplink relay sequence; and the BS is further configured to receive the MS request signal and to authenticate completeness of the MS request signal according to the MS authentication code.

5. The communication system as claimed in claim 4, wherein the BS, the RSs, and the MS have a downlink relay sequence from the BS to the MS;

one of the control signals is a first BS response signal, the authentication code of the first BS response signal comprises the RS authentication code and the MS authentication code;

the BS is further configured to generate and transmit the first BS response signal;

each of the RSs is further configured to receive the first BS response signal and to authenticate completeness of the first BS response signal according to the RS authentication code, the last RS in the downlink relay sequence is configured to remove the RS authentication code from the first BS response signal, generate a second BS response signal comprising the MS authentication code, and transmit the second BS response signal to the MS, wherein the second BS response signal is one of the control signals; and the MS is further configured to receive the second BS response signal from the last RS in the downlink relay sequence and authenticate completeness of the second BS response signal according to the MS authentication code.

6. The communication system as claimed in claim 5, wherein one of the control signals is an MS acknowledgement signal, the authentication code of the MS acknowledge signal comprises the MS authentication code;

the MS is further configured to generate and transmit the MS acknowledgement signal;

the RSs are further configured to relay the MS acknowledgement signal to the BS following the uplink relay sequence; and the BS is further configured to receive the MS acknowledgement signal and authenticate completeness of the MS acknowledgement signal according to the MS authentication code.

7. The communication system as claimed in claim 6, wherein one of the control signals is a BS confirmation signal, the authentication code of the BS confirmation signal comprises the RS authentication code;

the BS is further configured to generate and transmit the first BS confirmation signal; and each of the RSs is further configured to receive the BS confirmation signal and authenticate completeness of the BS confirmation signal according to the RS authentication code.

8. The communication system as claimed in claim 1, wherein the communication system conforms to the IEEE 802.16 standard, the control signals follow the dynamic service addition (DSA) of the IEEE 802.16 standard, the RS authentication code is a hashed message authentication code/cipher-based message authentication code (HMAC/CMAC) tuple with a group key for the RS based on the IEEE 802.16 standard, and the MS authentication code is an HMAC/CMAC tuple for the MS based on the IEEE 802.16 standard.

9. A handshake method for building a service path for a communication system for use in a wireless network, the communication system comprising a BS, a plurality of RSs, and an MS, one of the RSs being located within a coverage of the BS, the MS being located within a coverage of one of the RSs, the BS, the RSs and the MS having a downlink relay sequence from the BS to the MS, the handshake method comprising the following steps of:

generating, by the BS, a first BS request signal;

transmitting, by the BS, the first BS request signal to the next RS following the downlink relay sequence, the first BS request signal comprising an RS authentication code and an MS authentication code, the RS authentication code and the MS authentication code being adopted to authenticate completeness of the first BS request signal;

receiving, by each of the RSs, the first BS request signal;

authenticating, by each of the RSs, completeness of the first BS request signal according to the RS authentication code;

generating, by the last RS in the downlink relay sequence, a second BS request signal by removing the RS authentication code from the first BS request signal, the second BS request signal comprising the MS authentication code;

transmitting, by the last RS in the downlink relay sequence, the second BS request signal to the MS;

receiving, by the MS, the second BS request signal from the last RS in the downlink relay sequence; and authenticating, by the MS, completeness of the second BS request signal according to the MS authentication code.

10. The handshake method as claimed in claim 9, wherein the communication system has an uplink relay sequence from the MS to the BS and the handshake method further comprises the following steps of:

transmitting, by the MS, an MS response signal when the second BS request signal is complete, the MS response signal comprising the MS authentication code, the MS authentication code in the MS response signal being adopted to authenticate completeness of the MS response signal;

relaying, by the RSs, the MS response signal following the uplink relay sequence;

receiving, by the BS, the MS response signal;

authenticating, by the BS., completeness of the MS response signal according to the MS authentication code.

11. The handshake method as claimed in claim 10, further comprising the following steps of:

transmitting, by the BS, a first BS acknowledgement signal when the MS response signal is complete, the first BS acknowledgment signal comprising the RS authentication code and the MS authentication code for authenticating completeness of the first BS acknowledgement signal;
receiving, by each of the RSs, the first BS acknowledgement signal;
authenticating, by each of the RSs, completeness of the first BS acknowledgement signal according to the RS authentication code;
generating, by the last RS in the downlink relay sequence, a second BS acknowledgement signal by removing the RS authentication code from the first BS acknowledgment signal, the second BS acknowledgement signal comprising the MS authentication code;
transmitting, by the last RS in the downlink relay sequence, the second BS acknowledgment signal;
receiving, by the MS, the second BS acknowledgment signal from the last RS in the downlink relay sequence; and
authenticating, by the MS, the second BS acknowledgement signal according to the MS authentication code.

12. The handshake method as claimed in claim 9, wherein the communication system conforms to the IEEE 802.16 standard, the control signals follow the DSA of the IEEE 802.16 standard, the RS authentication code is an HMAC/CMAC tuple with a group key for the RS based on the IEEE 802.16 standard, and the MS authentication code is an HMAC/CMAC tuple for the MS based on the IEEE 802.16 standard.

13. A handshake method for building a service path for a communication system for use in a wireless network, the communication system comprising a BS, a plurality of RSs, and an MS, one of the RSs being located within a coverage of the BS, the MS being located within a coverage of one of the RSs, the BS, the RSs, and the MS having a downlink relay sequence, the handshake method comprising the following steps of:
receiving, by the BS, an MS request signal originated from the MS, the MS request signal comprising an MS authentication code, the MS authentication code being adopted to authenticate completeness of the MS request signal;
authenticating, by the BS, completeness of the MS request signal according to the MS authentication code;
generating, by the BS, a first BS response signal comprising an RS authentication code and the MS authentication code when the MS request signal is complete, the RS authentication code and the MS authentication code comprised in the first BS response signal being adopted to authenticate completeness of the first BS response signal;
receiving, by each of the RSs, the first BS response signal;
authenticating, by each of the RSs, completeness of the first BS response signal according to the RS authentication code;
generating, by the last RS in the downlink relay sequence, a second BS response signal by removing the RS authentication code from the first BS response signal, the second BS response signal comprising the MS authentication code;
transmitting, by the last RS in the downlink relay sequence, the second BS response signal to the MS;
receiving, by the MS, the second BS response signal from the last RS in the downlink relay sequence; and
authenticating, by the MS, completeness of the second BS response signal according to the MS authentication code.

14. The handshake method as claimed in claim 13, wherein the BS, the RSs, and, the MS have an uplink relay sequence from the MS to the BS, the handshake method further comprises the following steps of:
generating, by the MS, the MS request signal;
transmitting, by the MS, the MS request signal; and
relaying, by the RSs, the MS request signal following the uplink relay sequence.

15. The handshake method as claimed in claim 13, further comprising the following steps of:
generating, by the MS, an MS acknowledgement signal comprising the MS authentication code when the BS response signal is complete, the MS authentication code being adopted to authenticate completeness of the MS acknowledgement signal;
transmitting, by the MS, the MS acknowledgement signal when the BS response signal is complete;
relaying, by the RSs, the MS acknowledgement signal following the uplink relay sequence;
receiving, by the BS, the MS acknowledgement signal; and
authenticating, by the BS, completeness of the MS acknowledgement signal according to the MS authentication code.

16. The handshake method as claimed in claim 15, further comprising the following step of:
generating, by the BS., a BS confirmation signal comprising the RS authentication code when the MS acknowledgement signal is complete, the RS authentication code being adopted to authenticate completeness of the BS confirmation signal;
transmitting, by the BS, the BS confirmation signal;
receiving, by the RSs, the BS confirmation signal; and
authenticating, by the RSs, completeness of the BS confirmation signal according to the RS authentication code.

17. The handshake method as claimed in claim 13, wherein the communication system conforms to the IEEE 802.16 standard, the control signals follow the DSA of the IEEE 802.16 standard, the RS authentication code is an HMAC/CMAC tuple with a group key for the RS based on the IEEE 802.16 standard, and the MS authentication code is an HMAC/CMAC tuple for the MS based on the IEEE 802.16 standard.

* * * * *